(12) United States Patent
Kim et al.

(10) Patent No.: US 10,606,713 B2
(45) Date of Patent: Mar. 31, 2020

(54) USING DUAL CHANNEL MEMORY AS SINGLE CHANNEL MEMORY WITH COMMAND ADDRESS RECOVERY

(71) Applicant: INTERNATIONAL BUSINESS MACHINES CORPORATION, Armonk, NY (US)

(72) Inventors: Kyu-hyoun Kim, Chappaqua, NY (US); Warren E. Maule, Cedar Park, TX (US); Kevin M. McIlvain, Delmar, NY (US); Saravanan Sethuraman, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 11 days.

(21) Appl. No.: 15/860,875

(22) Filed: Jan. 3, 2018

(65) Prior Publication Data
US 2019/0205225 A1    Jul. 4, 2019

(51) Int. Cl.
*G06F 11/16* (2006.01)
*G06F 11/20* (2006.01)
(Continued)

(52) U.S. Cl.
CPC .......... *G06F 11/1666* (2013.01); *G06F 3/061* (2013.01); *G06F 3/0619* (2013.01);
(Continued)

(58) Field of Classification Search
CPC ............. G06F 11/1666; G06F 11/2094; G06F 11/1658; G06F 3/0683; G06F 3/061;
(Continued)

(56) References Cited

U.S. PATENT DOCUMENTS 7,343,458 B2   3/2008  Vogt
8,098,539 B2   1/2012  Sankuratri et al.
(Continued)

FOREIGN PATENT DOCUMENTS

CN   104809031 A   7/2015
CN   105556477 A   5/2016
(Continued)

OTHER PUBLICATIONS

International Search Report and Written Opinion for PCT/IB2018/060237 dated Apr. 28, 2019, 9 pages.
(Continued)

*Primary Examiner* — April Y Blair
*Assistant Examiner* — Rong Tang
(74) *Attorney, Agent, or Firm* — Cantor Colburn LLP; Bryan Bortnick

(57) ABSTRACT

A technique relates to operating a memory controller. A feedback mode is initiated such that an identified memory device of first memory devices includes an identified bit lane on a data bus to be utilized for testing. A process includes sending commands on the 1-N bit lanes of the command address bus to a buffer and duplicating commands designated for a selected one of the 1-N bit lanes. The process includes sending the duplicated commands on the identified bit lane in route to the buffer, and receiving a result of a parity check for the commands sent on the 1-N bit lanes, such that when the result is a pass the process ends. When the result is a fail, a duplicated parity check is performed using duplicated commands on the identified bit lane in place of the selected one. When the duplicated parity check passes, the selected one is bad.

20 Claims, 14 Drawing Sheets

(51) Int. Cl.
  *G06F 3/06* (2006.01)
  *G06F 13/42* (2006.01)
  *G06F 12/02* (2006.01)
  *G06F 12/06* (2006.01)

(52) U.S. Cl.
  CPC .......... *G06F 3/0644* (2013.01); *G06F 3/0683* (2013.01); *G06F 11/1658* (2013.01); *G06F 11/2094* (2013.01); *G06F 12/0246* (2013.01); *G06F 12/0638* (2013.01); *G06F 13/4239* (2013.01)

(58) Field of Classification Search
  CPC .. G06F 3/0619; G06F 3/0644; G06F 13/4239; G06F 12/0246; G06F 12/0638
  See application file for complete search history.

(56) References Cited

U.S. PATENT DOCUMENTS

| | | |
|---|---|---|
| 8,375,257 B2 | 2/2013 | Hong et al. |
| 8,719,493 B2 | 5/2014 | Berket et al. |
| 2004/0163028 A1 | 8/2004 | Olarig |
| 2009/0031078 A1 | 1/2009 | Warnes et al. |
| 2010/0030942 A1 | 2/2010 | Hinkle et al. |
| 2010/0217915 A1 | 8/2010 | O'connor et al. |
| 2013/0254506 A1 | 9/2013 | Berke et al. |
| 2014/0047265 A1 | 2/2014 | Das et al. |
| 2014/0237265 A1 | 8/2014 | Mothilal |
| 2015/0049539 A1 | 2/2015 | Wang |
| 2015/0220410 A1 | 8/2015 | Das et al. |
| 2015/0262633 A1 | 9/2015 | Lee |
| 2015/0310898 A1 | 10/2015 | Takefman et al. |
| 2016/0110102 A1 | 4/2016 | Lee |
| 2016/0132241 A1 | 5/2016 | Perego et al. |
| 2016/0134307 A1 | 5/2016 | Hu et al. |
| 2016/0232063 A1 | 8/2016 | Das et al. |
| 2016/0364291 A1 | 12/2016 | Kang |
| 2017/0287538 A1 | 10/2017 | Gonzalez |
| 2019/0206477 A1 | 7/2019 | Kim et al. |

FOREIGN PATENT DOCUMENTS

| | | |
|---|---|---|
| WO | 2013142512 A1 | 9/2013 |
| WO | 2015016883 A1 | 2/2015 |

OTHER PUBLICATIONS

Kyu-hyoun Kim et al., "Using Dual Channel Memory As Single Channel Memory With Spares", Related Application, U.S. Appl. No. 15/860,871, filed on Jan. 3, 2018.

List of IBM Patents or Patent Applications Treated As Related; (Appendix P), filed Jan. 3, 2018; pp. 1-2.

Kyu-hyoun Kim et al., "Using Dual Channel Memory As Single Channel Memory With Spares," U.S. Appl. No. 16/674,235, filed Nov. 5, 2019.

List of IBM Patents or Patent Applications Treated As Related; (Appendix P); Date Filed: Nov. 5, 2019, 2 pages.

DRIVE, BY THE MEMORY CONTROLLER, FIRST MEMORY DEVICES AND SECOND MEMORY DEVICES IN A DUAL CHANNEL MODE, WHEREIN A FIRST ERROR CORRECTION CODE (ECC) MEMORY DEVICE AND A SECOND ECC MEMORY DEVICE PROTECT THE FIRST MEMORY DEVICES AND THE SECOND MEMORY DEVICES 402

↓

DRIVE, BY THE MEMORY CONTROLLER, THE FIRST MEMORY DEVICES AND THE SECOND MEMORY DEVICES IN A SINGLE CHANNEL MODE SUCH THAT THE SECOND ECC MEMORY DEVICE IS A SPARE MEMORY DEVICE, WHEREIN THE FIRST ECC MEMORY DEVICE PROTECTS THE FIRST MEMORY DEVICES AND THE SECOND MEMORY DEVICES, WHEREIN THE MEMORY CONTROLLER IS CONFIGURED TO SWITCH BETWEEN THE DUAL CHANNEL MODE AND THE SINGLE CHANNEL MODE 404

CONFIGURE THE MEMORY CONTROLLER TO OPERATE IN A DUAL CHANNEL MODE, WHEREIN OPERATING IN THE DUAL CHANNEL MODE COMPRISES DRIVING TWO 32 BIT DATA CHANNELS WITH 7 BITS OF ERROR CORRECTING CODE (ECC) MEMORY  502

↓

CONFIGURE THE MEMORY CONTROLLER TO OPERATE IN A SINGLE CHANNEL MODE, WHEREIN OPERATING IN THE SINGLE CHANNEL MODE COMPRISES DRIVING A SINGLE 64 BIT CHANNEL WITH 8 BITS OF ECC MEMORY SUCH THAT AN 8 BIT SPARE MEMORY DEVICE IS AVAILABLE, WHEREIN THE MEMORY CONTROLLER DOES NOT CONCURRENTLY OPERATE IN BOTH THE SINGLE CHANNEL MODE AND THE DUAL CHANNEL MODE  504

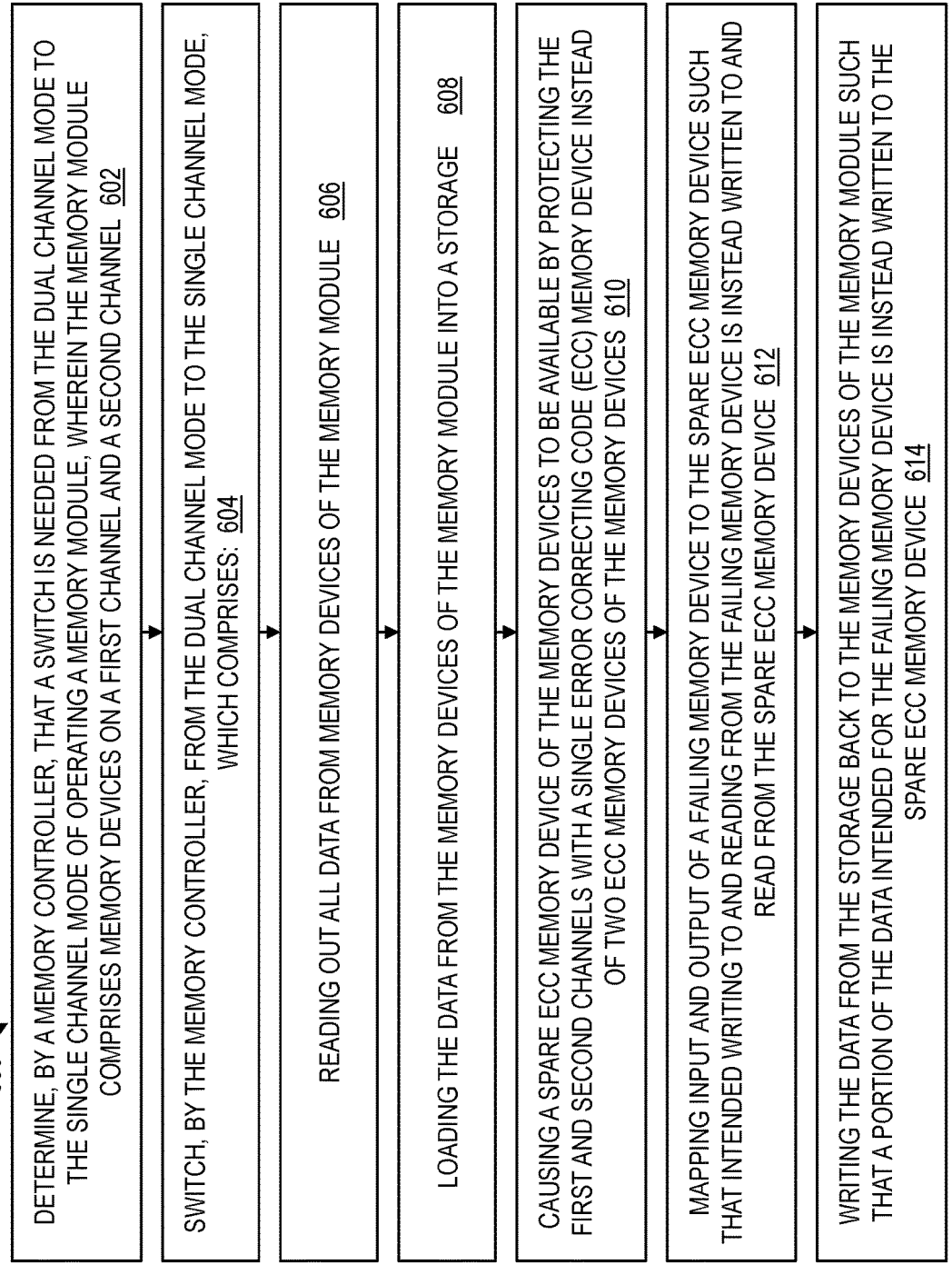

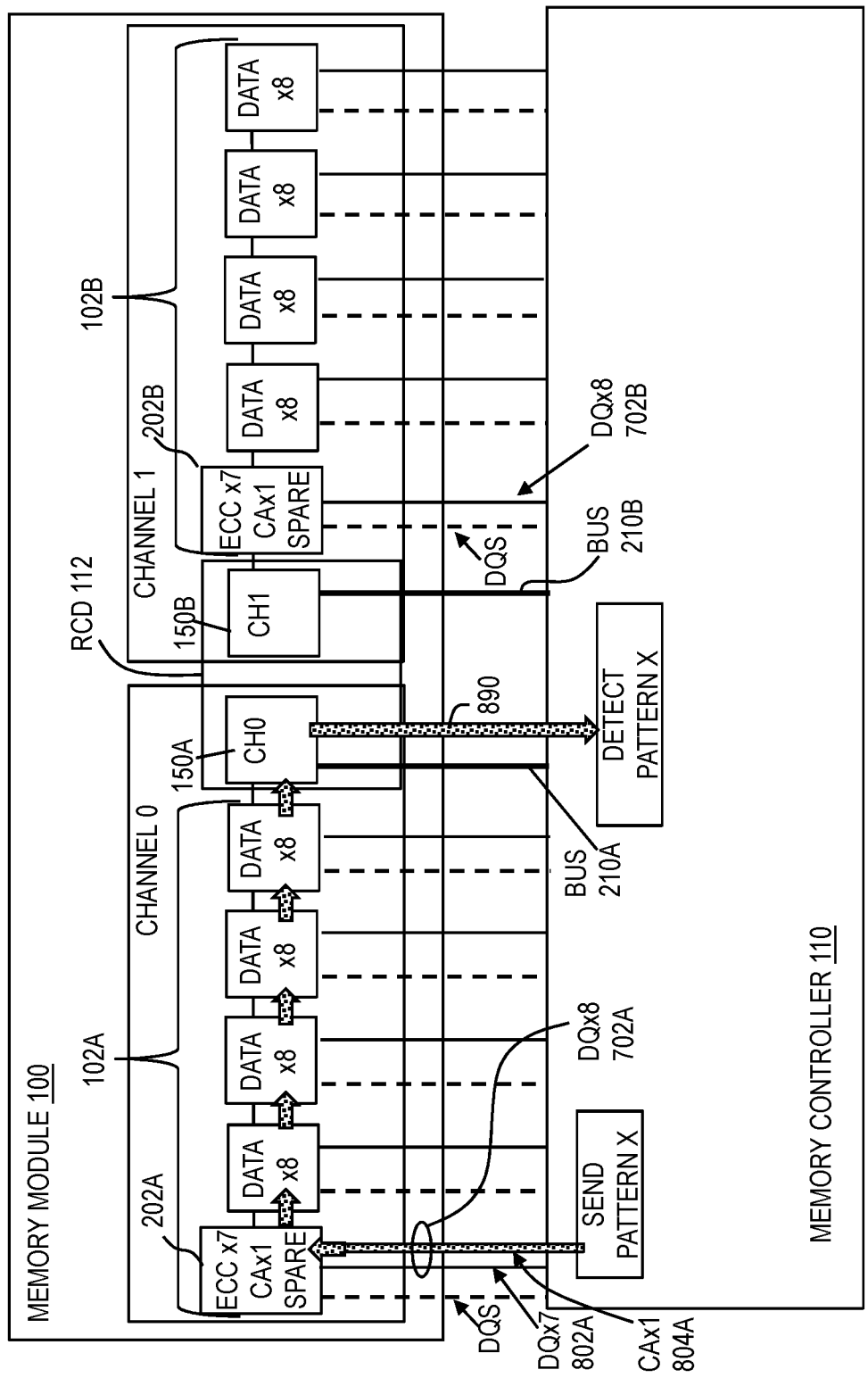

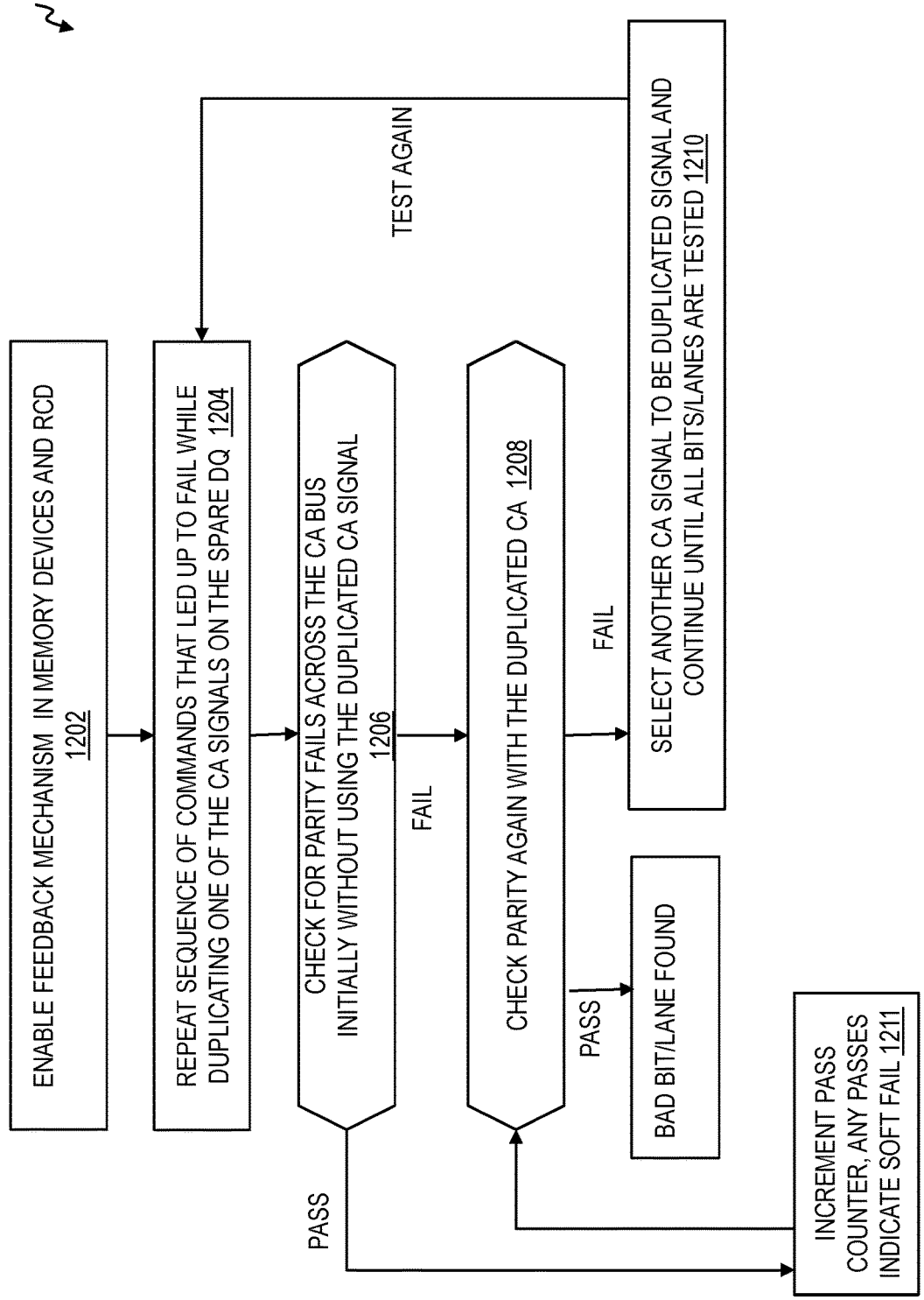

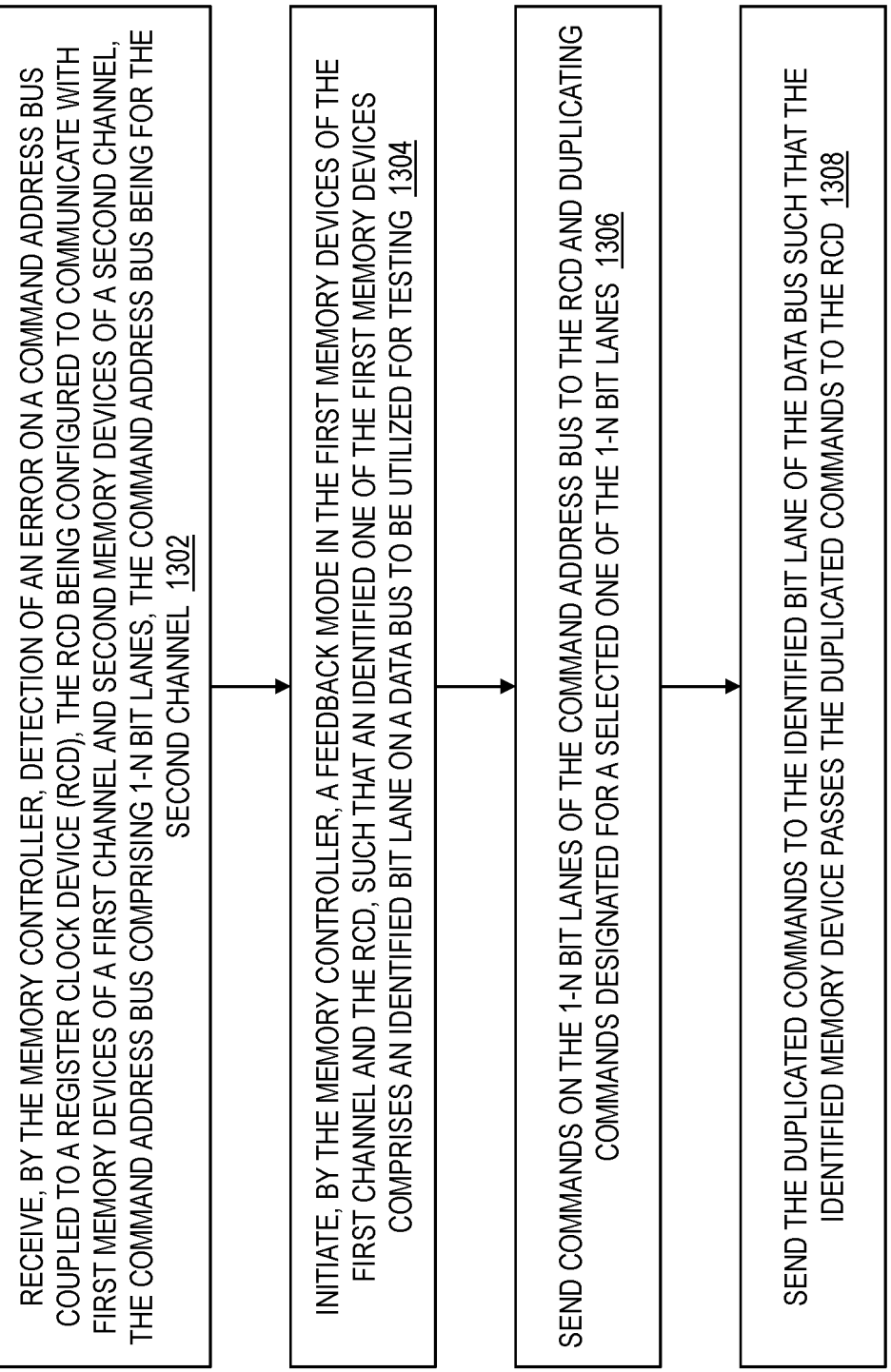

FIG. 13B 1300

RECEIVE A RESULT OF A PARITY CHECK FOR THE COMMANDS SENT ON THE 1-N BIT LANES, SUCH THAT WHEN THE RESULT IS A PASS THE PROCESS ENDS 1310

↓

WHEN THE RESULT IS A FAIL, CHECK A DUPLICATED PARITY CHECK USING THE DUPLICATED COMMANDS SENT ON THE IDENTIFIED BIT LANE IN PLACE OF THE SELECTED ONE OF THE 1-N BIT LANES AND USING THE COMMANDS SENT ON THE 1-N BIT LANES EXCEPT THE SELECTED ONE OF THE 1-N BIT LANES 1312

↓

WHEN THE DUPLICATED PARITY CHECK IS A PASS USING THE DUPLICATED COMMANDS ON THE IDENTIFIED BIT LANE, DETERMINE THAT THE SELECTED BIT LANE IS BAD AND ENDING THE PROCESS 1314

↓

WHEN THE DUPLICATED PARITY CHECK IS A FAIL, SELECT A NEXT ONE OF THE 1-N BIT LANES AS THE SELECTED ONE AND REPEATING THE PROCESS 1316

USING DUAL CHANNEL MEMORY AS SINGLE CHANNEL MEMORY WITH COMMAND ADDRESS RECOVERY

BACKGROUND

The present invention relates generally to memory modules, and more specifically, to using dual channel memory as single channel memory with command address recovery in a memory module.

A dual in-line memory module (DIMM) includes a series of dynamic random-access memory (DRAM) integrated circuits. These DIMMS are mounted on a printed circuit board and designed for use in, for example, personal computers, workstations, and servers. DIMMs have replaced SIMMs (single in-line memory modules) as the predominant type of memory in state-of-the-art processors. While the contacts on SIMMs on both sides are redundant, DIMMs have separate electrical contacts on each side of the module. Another difference is that standard SIMMs have a 32-bit data path, while standard DIMMs have a 64-bit data path. Many processors have a 64-bit bus width, requiring SIMMs installed in matched pairs in order to populate the data bus. The processor would then access the two SIMMs in parallel. However, DIMMs were introduced to eliminate this disadvantage of SIMMs.

SUMMARY

Embodiments of the present invention are directed to a method for operating a memory controller. Non-limiting examples of the method include receiving, by the memory controller, detection of an error on a command address bus coupled to a memory interface buffer, the memory interface buffer being configured to communicate with first memory devices of a first channel and second memory devices of a second channel, the command address bus comprising 1-N bit lanes, the command address bus being for the second channel. The method includes initiating, by the memory controller, a feedback mode in the first memory devices of the first channel and the memory interface buffer, such that an identified memory device of the first memory devices comprises an identified bit lane on a data bus to be utilized for testing, and performing a process. The process includes sending commands on the 1-N bit lanes of the command address bus to the memory interface buffer and duplicating commands designated for a selected one of the 1-N bit lanes, and sending the duplicated commands to the identified bit lane of the data bus such that the identified memory device passes the duplicated commands to the memory interface buffer. Also, the process includes receiving a result of a parity check for the commands sent on the 1-N bit lanes, such that when the result is a pass the process ends, and when the result is a fail, checking a duplicated parity check using the duplicated commands sent on the identified bit lane in place of the selected one of the 1-N bit lanes and using the commands sent on the 1-N bit lanes except the selected one of the 1-N bit lanes. The process includes, when the duplicated parity check is a pass using the duplicated commands on the identified bit lane, determining that the selected one is bad and ending the process, and when the duplicated parity check is a fail, selecting a next one of the 1-N bit lanes as the selected one and repeating the process.

Embodiments of the present invention are directed to a memory controller. Non-limiting examples of the memory controller include a circuit configured to control a memory module, the circuit being operable to perform operations. The operations include receiving, by the circuit, detection of an error on a command address bus coupled to a memory interface buffer, the memory interface buffer being configured to communicate with first memory devices of a first channel and second memory devices of a second channel, the command address bus comprising 1-N bit lanes, the command address bus being for the second channel. The operations include initiating, by the circuit, a feedback mode in the first memory devices of the first channel and the memory interface buffer, such that an identified memory device of the first memory devices comprises an identified bit lane on a data bus to be utilized for testing, and performing a process. The process includes sending commands on the 1-N bit lanes of the command address bus to the memory interface buffer and duplicating commands designated for a selected one of the 1-N bit lanes, and sending the duplicated commands to the identified bit lane of the data bus such that the identified memory device passes the duplicated commands to the memory interface buffer. Also, the process includes receiving a result of a parity check for the commands sent on the 1-N bit lanes, such that when the result is a pass the process ends, and when the result is a fail, checking a duplicated parity check using the duplicated commands sent on the identified bit lane in place of the selected one of the 1-N bit lanes and using the commands sent on the 1-N bit lanes except the selected one of the 1-N bit lanes. The process includes, when the duplicated parity check is a pass using the duplicated commands on the identified bit lane, determining that the selected one is bad and ending the process, and when the duplicated parity check is a fail, selecting a next one of the 1-N bit lanes as the selected one and repeating the process.

Embodiments of the present invention are directed to a computer program product for operating a memory controller. Non-limiting examples of the computer program product include a computer readable storage medium having program instructions embodied therewith, the program instructions readable by the memory controller to cause the memory controller to perform a method. The method includes receiving, by the memory controller, detection of an error on a command address bus coupled to a memory interface buffer, the memory interface buffer being configured to communicate with first memory devices of a first channel and second memory devices of a second channel, the command address bus comprising 1-N bit lanes, the command address bus being for the second channel. The method includes initiating, by the memory controller, a feedback mode in the first memory devices of the first channel and the memory interface buffer, such that an identified memory device of the first memory devices comprises an identified bit lane on a data bus to be utilized for testing, and performing a process. The process includes sending commands on the 1-N bit lanes of the command address bus to the memory interface buffer and duplicating commands designated for a selected one of the 1-N bit lanes, and sending the duplicated commands to the identified bit lane of the data bus such that the identified memory device passes the duplicated commands to the memory interface buffer. Also, the process includes receiving a result of a parity check for the commands sent on the 1-N bit lanes, such that when the result is a pass the process ends, and when the result is a fail, checking a duplicated parity check using the duplicated commands sent on the identified bit lane in place of the selected one of the 1-N bit lanes and using the commands sent on the 1-N bit lanes except the selected one of the 1-N bit lanes. The process includes, when the duplicated parity check is a pass using the duplicated commands on the identified bit lane, determining that the selected one is bad and ending the process, and when the duplicated parity check is a fail, selecting a next one of the 1-N bit lanes as the selected one and repeating the process.

BRIEF DESCRIPTION OF THE DRAWINGS

FIG. 4 is a flow chart of a method for operating the memory controller according to embodiments.

FIG. 5 is a flow chart of a method of configuring a memory controller according to embodiments.

FIG. 6 is a flow chart of a method of switching from dual channel mode to single channel mode according to embodiments.

FIG. 11 is a schematic of the memory module connected to the memory controller illustrating calibration in preparation for command address recovery according to embodiments.

FIG. 12 is a flow chart of detecting which command address lane that a fail occurred on according to embodiments.

FIG. 13A is a flow chart of a method for operating a memory controller according to embodiments.

FIG. 13B continues the flow chart of FIG. 13A for operating the memory controller according to embodiments.

DETAILED DESCRIPTION

Figure 1:
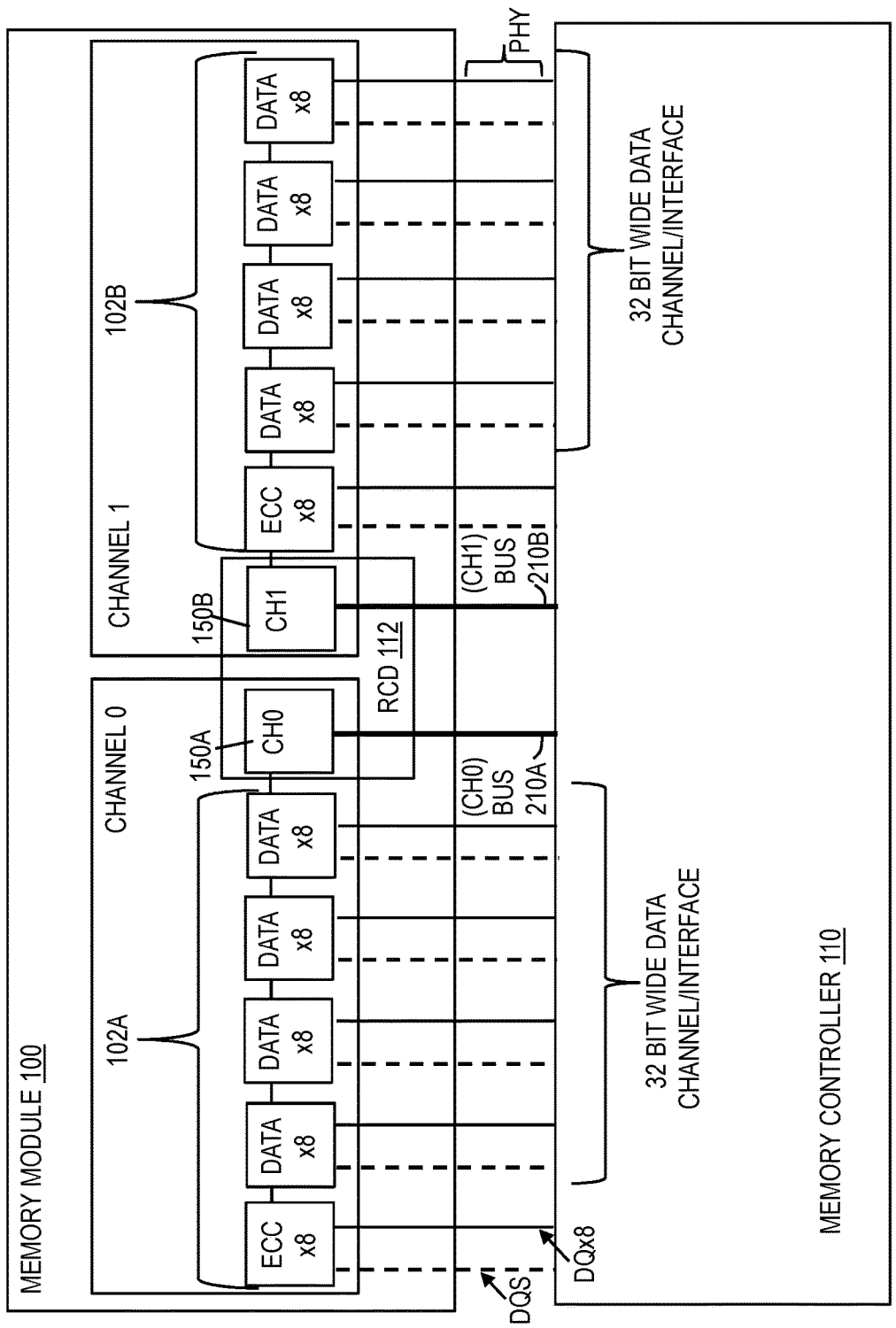
FIG. 1 is a schematic of a memory module connected to a memory controller.

Various embodiments of the invention are described herein with reference to the related drawings. Alternative embodiments of the invention can be devised without departing from the scope of this document. It is noted that various connections and positional relationships (e.g., over, below, adjacent, etc.) are set forth between elements in the following description and in the drawings. These connections and/or positional relationships, unless specified otherwise, can be direct or indirect, and are not intended to be limiting in this respect. Accordingly, a coupling of entities can refer to either a direct or an indirect coupling, and a positional relationship between entities can be a direct or indirect positional relationship. As an example of an indirect positional relationship, references to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The descriptions of the various embodiments of the present invention have been presented for purposes of illustration, but are not intended to be exhaustive or limited to the embodiments discussed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments discussed herein.

The term "about" and variations thereof are intended to include the degree of error associated with measurement of the particular quantity based upon the equipment available at the time of filing the application. For example, "about" can include a range of ±8% or 5%, or 2% of a given value.

High end and low end computing systems, in most cases, employ high speed memory interfaces such as those commonly known as double data rate (DDR) synchronous DRAM (SDRAM). DDR memory and the associated interface is bounded by the industry standard specification body known as Joint Electron Device Engineering Council (JEDEC). Although DDR memory is standardized through JEDEC, the need for high and low end computer systems which employ DDR memory subsystems are very different. For example recoverability, availability, and serviceability (RAS), power/thermal, and performance (bandwidth, latency, speed) needs are very different when considering a low end personal computer (PC) versus a high end mainframe. Because lower end computer systems have sales volumes that are much larger than high end computer systems, the lower end system requirements weigh heavier in the standardization of DDR SDRAM module DIMM definitions. This results in a DRAM DIMM that is optimized for the lower end, lower cost computer systems (such as PCs). The higher end computer systems which may require a higher level of RAS and which may include DRAM device sparing are left to develop customized DIMMs, thereby increasing system cost by a significant amount. Embodiments provide a method and system to use a dual memory channel DRAM DIMM (optimized for the lower end computer systems) as a single channel DIMM with sparing. This allows the higher end computer systems to make use of the lower cost DIMM while still achieving a higher level of RAS. A lower end computer system has DIMMs (memory modules) that do not require spare memory devices. However, using the same DIMMs designed for the lower end computer system, embodiments are configured to improve the RAS of the DIMM by creating a spare memory device (i.e., a spare DRAM array).

In the state-of-the-art, there exist dual channel memory systems that run in "lockstep" where the same address is presented to both channels. The state-of-the-art requires the use of two DIMMs. However, embodiments employ only one DIMM even while the dual channel memory system run in "lockstep" in which the same address is presented to both channels. Embodiments allow for use of a single dual channel DIMM as a single channel DIMM (which is like two channels in lockstep) with the added benefit of a spare memory device. In addition to the spare memory (DRAM) device, a spare RCD device can also be deployed. In some embodiments, the spare RCD and spare DRAM memory device may be disabled to save power as compared to running two separate channels with both RCD devices and the spare active on the dual channel DIMM. The state-of-the-art system using the current DDR DIMM technology in pairs do not allow for a spare device. Additionally, embodiments can be performed for a single RCD and for dual RCDs.

FIG. 1 is a schematic of a memory module 100 connected to a memory controller 110. The memory module 100 can be a DDR5 DIMM. In this example, the memory module 100 has channel 0 and channel 1. Channel 0 includes memory devices 102A while channel 1 includes memory devices 102B. The memory devices 102A and 102B are each arrays of DRAM as understood by one skilled in the art. Each of the memory devices 102A and 102B are illustrated as being 8 bit wide chips with the designation "×8" which means by 8. It should be appreciated that the memory devices can be 4 bit wide chips (i.e., ×4). Furthermore, although the memory module is shown composed of ×8 memory devices, the memory module 100 may be composed of DRAM devices (such as memory devices 102A and 102B) of other widths including ×4, ×8, ×16, ×32 or any combination. The memory module 100 in FIG. 1 is shown with two command busses; however it could have 1 or more command address busses.

Channels are the highest level structure at the local memory controller level. Computers can have one, two, three, or more channels, but two channels are illustrated in this example. Each memory device in channel 0 has a matching memory device in the same location in channel 1.

Channel 0 has a dedicated error correcting code (ECC) memory device 102A while the other memory devices 102A are data memory devices. Similarly, channel 1 has a dedicated error correcting code (ECC) memory device 102B while the other memory devices 102B are data memory devices. The data memory devices 102A in channel 0 and the data memory devices 102B in channel 1 are configured to store data (for reading and writing) as understood by one skilled in the art. The ECC memory device 102A is configured to provide error protection for the data memory devices 102A. The ECC memory device 102B is configured to provide error protection for the data memory devices 102B. In the memory module 100, there are two 32-bit data per channels. This means that the 4 data memory devices 102A in channel 0 provide a 32-bit wide data interface (×32 data per channel) to the memory controller 110, and the 4 data memory devices 102B in channel 1 provide a 32-bit wide data interface (×32 data per channel) to the memory controller 110 for reading or writing. The burst length (BL) can be 16, where over one read or write there are 16 transfers of 32b for a total data transfer of 64B. For a single ECC memory device (such as ECC memory device 102A or ECC memory devices 102B), error correcting code over 32-bits of data requires 7 bits of ECC memory such that an additional 8 bit (×8) ECC memory device is needed per channel. Therefore, a single ECC memory device (such as ECC memory device 102A or ECC memory devices 102B) can only protect a single channel (32-bit data channel). Accordingly, ECC memory device 102A protects the 4 data memory devices 102A (i.e., protects 32-bit data channel which is 4×8=32-bits), and the ECC memory devices 102B protects the 4 data memory devices 102B (i.e., protects 32-bit data channel). Therefore, the memory module 100 requires two ECC memory devices which are illustrated as ECC memory device 102A and ECC memory devices 102B.

The data stored in memory devices in 102A and 102B are protected by the error correcting codes (ECC) stored within the ECC device. ECC codes are commonly used with many types of computer data storage to detect and correct the most common kinds of data corruption. Problems can be mitigated by using DRAM modules that include extra memory bits (ECC memory devices 102A and 102B) and memory controller 110 that exploit these bits. These extra bits are used to record parity or ECC (i.e., use an error correcting code) such as SECDED (single error correct dual error detect). Parity allows the detection of a single-bit error (actually, any odd number of wrong bits). A common error correcting code, a single-error correction and double-error detection (SECDED) Hamming code, allows a single-bit error to be corrected and (in the usual configuration, with an extra parity bit) double-bit errors to be detected.

A registering/register clock driver (RCD) 112 is connected to both channel 0 and channel 1. The RCD 112 can be a chip on the memory module 100. The RCD 112 is configured for routing and loads to the data memory devices 102A on channel 0 via channel 0 command address (CA) bus 210A and routing and loads to data memory devices 102B on channel 1 via channel 1 command address (CA) bus 210B. The registering/register clock driver 112 is also a buffer device. The RCD 112 is connected to the memory devices 102A (including both data memory devices and the ECC memory devices). The RCD 112 is connected to the memory devices 102B (including both data memory device and the ECC memory devices). In some implementations, the RCD can be a memory interface buffer or memory interface chip. The RCD can include command address buffers for buffering the command address signal, data buffers for buffering the memory data, and/or a unified buffer chip that buffers both the command address and the memory data.

The RCD 112 includes logic 150A for controlling channel 0 and logic 150B for controlling channel 1 for an industry standard DIMM in the state-of-the-art as understood by one skilled in the art. In normal dual channel mode, the channel 0 logic 150A passes along the command and address information from memory controller 110 to the desired memory devices 102A on one side (channel 0) of the DIMM and the channel 1 logic 150B passes along the command and address information from memory controller 110 to the desired memory devices 102B on the other side (channel 1).

The memory controller 110 is configured to communicate with the memory module 100 via the command address (CA) lines (which are CH0 bus 210A CH1 bus 210B) to the RCD 112. Read and write commands are issued from the memory controller 110 to the RCD 112 for channel 0 via logic 150A and issued from the memory controller 110 to the RCD 112 for channel 1 via logic 150B. For example, a write could be occurring on channel 0 (via CH0 bus 210A) while a read is occurring on channel 1 (via CH1 bus 210B) of the memory module 100. Therefore, all of the software used by the memory controller 110 to control the memory devices 102A and memory devices 102B (i.e., DRAMs) is through the RCD 112. The memory controller 110 can be a DDR5 memory controller with a physical layer interface (PHY) to connect to the memory module 100 (e.g., DDR5 DIMM). Current standards are transitioning from DDR4 to DDR5 as understood by one skilled in the art. Further, each of the memory devices 102A and 102B are connected to the memory controller 110 via DQS and DQ×8, where DQS is data strobe and DQ×8 is data by 8 bits.

Figure 2:
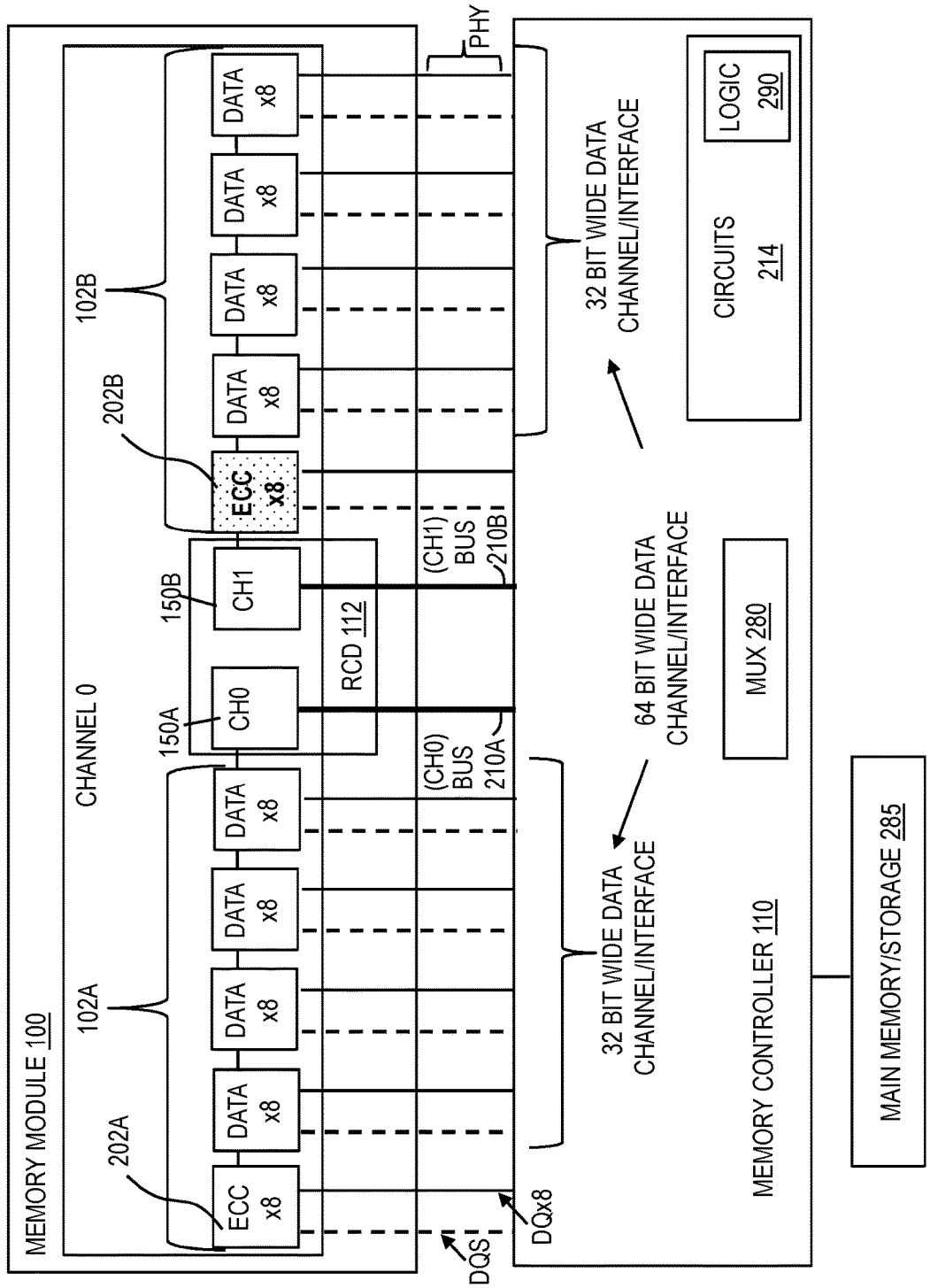
FIG. 2 is a schematic of the memory module connected to a modified memory controller according to embodiments.

FIG. 2 is a schematic of the memory module 100 connected to a modified memory controller 110 according to embodiments. The memory controller 110 can include the functionality of the memory controller 110 discussed above along with additional functionality as discussed herein. Instead of operating the memory module 100 a dual channel memory (i.e., as separate 32-bit data channel 0 and separate 32-bit data channel 1), the memory controller 110 is configured to switch and operate the memory module 100 as a single channel having a single 64-bit data channel 0. In other words, the memory controller 110 is configured to switch from operating the memory module 100 in a dual channel memory mode to a single channel memory mode (and vice versa). For explanation purposes, the single 64-bit data channel 0 is shown but it is understood that the single 64-bit data channel 0 is actually both channels 0 and 1.

In normal dual channel mode, the memory controller 110 is configured to issue the command and address information to the channel 0 logic 150A of the RCD 112 via CH0 command address bus 210A for the memory devices 102A of channel 0. Similarly, the memory controller 110 is configured to issue the command and address information to the channel 1 logic 150B of the RCD 112 via CH1 command address bus 210B for the memory devices 102B of channel 1 in dual channel mode. In dual channel mode, two ECC memory devices, which are ECC memory device 102A and ECC memory device 102B, are needed. However, when combining both channels 0 and 1 as one channel (for example, channel 0) in single channel mode, the memory controller 110 is configured to issue the same command and address information to both channels 0 and 1 at the same time making them act together as one large channel (i.e., as a 64-bit wide data channel) in single channel mode; this command and address information is simultaneously (or nearly simultaneously) issued on CH0 bus 210A and CH1 bus 210B. In single channel mode, only one ECC memory device is needed, which can be either ECC memory device 102A or ECC memory device 102B, as discussed further below. For explanation purposes, ECC memory device 102A is designated for error correcting code memory.

As seen in FIG. 2, embodiments provide the ×64 data per channel driven memory module 100 that can have a burst length (BL) 8 where BL 8 means 8 bursts of data from the memory device/module 100, if a device is an ×8 then 8 bursts of data is equivalent to 64*b* of data. In a typical DDR4 memory system, the memory devices comprise a 64*b* wide interface and the standard data transmission is BL8 which is equivalent to 64*b* of data over 8 bursts which is equivalent to 64 bytes of data. In a DDR5 memory system, there may be BL 16 where a data transmission over one 32 bit wide memory channel would be 16 beats of 32 bits per beat which again is equal to 64 bytes as in the DDR4 memory system. Other burst lengths are also possible such as BL4 or BL32. The burst length is the amount of data transferred between the central processor unit (i.e., processor) and memory in each transmission. In FIG. 2, there is 64-bit of data per burst of the BL 8 transmission for a total of 64-byte per write or read and other BL lengths are inclusive of embodiments. Accordingly, error correcting code over (protecting) 64-bits of data requires 8 bits, which means protecting 64-bits of data requires one ×8 ECC memory device 102A or 102B (but not both) in single channel mode. Thus during one BL8 transmission, there is a total of 8-bytes of ECC data. In accordance with embodiments, the memory controller 110 is configured to use the extra ECC memory device as a spare memory device (which is available as a spare data memory device and/or a spare ECC memory device because they both are the same memory device but used for different purposes). The memory controller 110 is configured to utilize one of the ECC memory devices 102A and 102B for error correcting code memory for the single 64-bit data channel (in the single channel mode), while the other unused ECC memory device is a spare (not utilized for ECC). For illustration purposes, the ECC memory device 102A is designated as 202A and the ECC memory device 102B is designated as 202B in order to highlight operation as the ECC memory device protecting 64-bit data interface versus operation as a spare memory device. The ECC memory device 202A of memory devices 102A can operate as the ECC memory device for the single 64-bit data channel in the single channel mode, while the ECC memory device 202B of the memory device 102B operates as the spare memory device. In the event of a failure of any one memory device in the data memory devices 102A and 102B, the memory controller 110 is configured to utilize the spare (ECC) memory device 202B to replace the failed memory device. For explanation purposes and not limitation, the following is an example scenario of how this can be accomplished according to embodiments. The memory controller 110 may begin to use the spare device 202B upon certain conditions such a repeated memory transmission fails between the connections of a memory device 102A or 102B and the memory controller 110 or failure of memory storage locations within the memory device 102A or 102B. Typically failures are found when the data is received by the memory controller 110, and the memory controller 110 checks the data against the ECC code (e.g., by using ECC memory device 202A) to indicate erroneous data. Typical ECC codes can be used to correct single bit fails and detect double bit fails. The memory controller 110 can use this checking to determine the location of the fault in the system (memory module 100). Upon detection of fails for a particular memory device 102A or 102B, the memory controller 110 may choose to disable that data memory device (e.g., one data memory device in 102A or 102B) and use a spare ECC memory device 202B. This is usually done while the errors are still correctable. In some embodiments, the memory controller 110 enables the spare device (i.e., spare ECC memory device 202B) and then performs a series of read then write operations through all of memory where the data from the erroneous device (e.g., one data memory device in 102A or 102B) would be read, corrected, and written back to memory. However, on the write, the spare device (i.e., spare ECC memory device 202B) gets a copy of the data from (or intended to) the failing device (e.g., one data memory device in 102A or 102B). This mechanism may require a programmable multiplexer network 280 which allows any memory devices' data to be written to another memory device on the DIMM. Therefore, if a data memory device 102A, 102B fails or if the ECC memory device 202A fails, the memory controller 110 can switch to the spare memory device 202B as a data memory device or an ECC memory device as needed. The memory controller 110 is configured to issue the necessary commands to the address of the spare memory device 202B via CH0 bus 210A and CH1 bus 210B instead of the failed memory device, thereby having implemented RAS when the memory module 100 was originally designed without RAS (i.e., without a spare memory device 202B).

In FIG. 2, the operation of the DDR5 DIMM as a single channel requires no modification to the DDR5 DIMM (memory module 100) itself. However, the memory controller 110 is configured to drive the same command and address (CA) to both channels 0 and 1 (via busses 210A and 210B) creating a single double wide channel in which the memory module 100 now has spare memory device 202B. In some embodiments, the memory controller 110 is configured to turn off the ECC memory device 202B (of the memory devices 102B) and/or disable the ECC memory device 202B from functioning as error correcting code memory, such that the ECC memory device 202B is available as a spare. In single channel mode, the memory controller 110 is configured to issue any commands to the ECC memory device 202A which would have previously been addressed to the ECC memory device 202B. Also, in the event of a failure to any one of the memory devices 102A and 102B, the memory controller 110 is also configured to address commands to the spare (ECC) memory device 202B in order to save data on the spare (ECC) memory device 202B. The memory controller 110 is configured with circuits 214 as hardware to function as discussed herein. The circuits 214 can include logic 290, buffers, etc., to operate has discussed herein. The memory controller 110 includes the standard hardware to operatively connect to the memory module and a central processing unit (i.e., processor not shown) as understood by one skilled in the art. In one case, the logic 290 can include firmware and/or minicode such that the circuit 214 executes the logic 290 to operate as discussed herein. The logic 290 can be in the form of executable instructions, application specific integrated circuits (ASIC), etc.

The memory controller 110 can be switched back and forth between operating the memory module 100 in dual channel mode and single channel mode. For example, a user can select a setting of single channel mode and/or dual channel mode on the memory controller 110. For example, upon the memory controller 110 detecting a failed memory device in the memory devices 102A and 102B, the memory controller 110 can be configured to switch from dual channel mode (i.e., operating channel 0 and channel 1 separately) to single channel mode such that the spare memory device 202B can be utilized in place of the failed memory device. For explanation purposes and not limitation, the following is an example scenario of how the memory controller 110 can switch from dual channel mode to single channel mode. Typically, when running in dual channel mode, there are no spare devices because each $32b$ wide channel 102A and 102B is using its ECC memory devices (ECC memory devices 202A and 202B, respectively) to detect and correct fails on their respective channels 0 and 1. However, in one embodiment, should the single bit error rate on any data memory device begin to increase (e.g., the bit error rate reaches a predefined threshold), the memory controller 110 recognizes reaching the predefined threshold as a trigger that the memory controller 110 needs to spare out the failing device. The memory controller 110 is configured spare out the failing memory device. Yet, in the dual channel configuration, there are no spare devices, and the memory controller 110 is configured to switch from dual channel mode to single channel mode (thereby making a spare memory device available to be used in place of the failing memory device). In the dual channel system, this switch may require the memory controller 110 to read out all data from the DIMM from both channels (i.e., read out all data from both memory devices 102A and 102B), to place the data into storage 285 (e.g., main memory), to switch the memory module 100 into single channel mode where there is one $64b$ wide channel which requires one ECC device (e.g., ECC memory device 202A) leaving one ECC device unused as a spare (e.g., spare ECC memory device 202B). The memory controller 110 is configured to map the failing device (e.g., one data memory device 102A (or one data memory device 102B)) to the unused ECC device, e.g., spare ECC memory device 202B) as a spare and then write all of the memory back to the DIMM (into the respective memory devices 102A and 102B).

It should be appreciated that the memory controller 110 is configured to run in either two 32-bit data channels with 7 bit ECC code (i.e., dual channel mode) and switch to a single $64b$ channel with 8 bit ECC code and 8 spare memory device (i.e., single channel mode), when using a standard DDR5 DIMM (memory module 100). With typical SECDED (single error correct, dual error detect) ECC coding, the number of bits required to detect and correct fails reduces and the number of bits being checked increases. To cover $32b$ of data with SECDED ECC, seven bits of ECC code are required, and to cover $64b$ of data with SECDED ECC, only one more bit of ECC code is required for a total of 8 bits. Dual channel mode issues command and address information separately and independently on the CH0 bus 210A and CH1 bus 210B. Single channel mode issues the same command and address information on both CH0 bus 210A and CH1 bus 210B.

Figure 3:
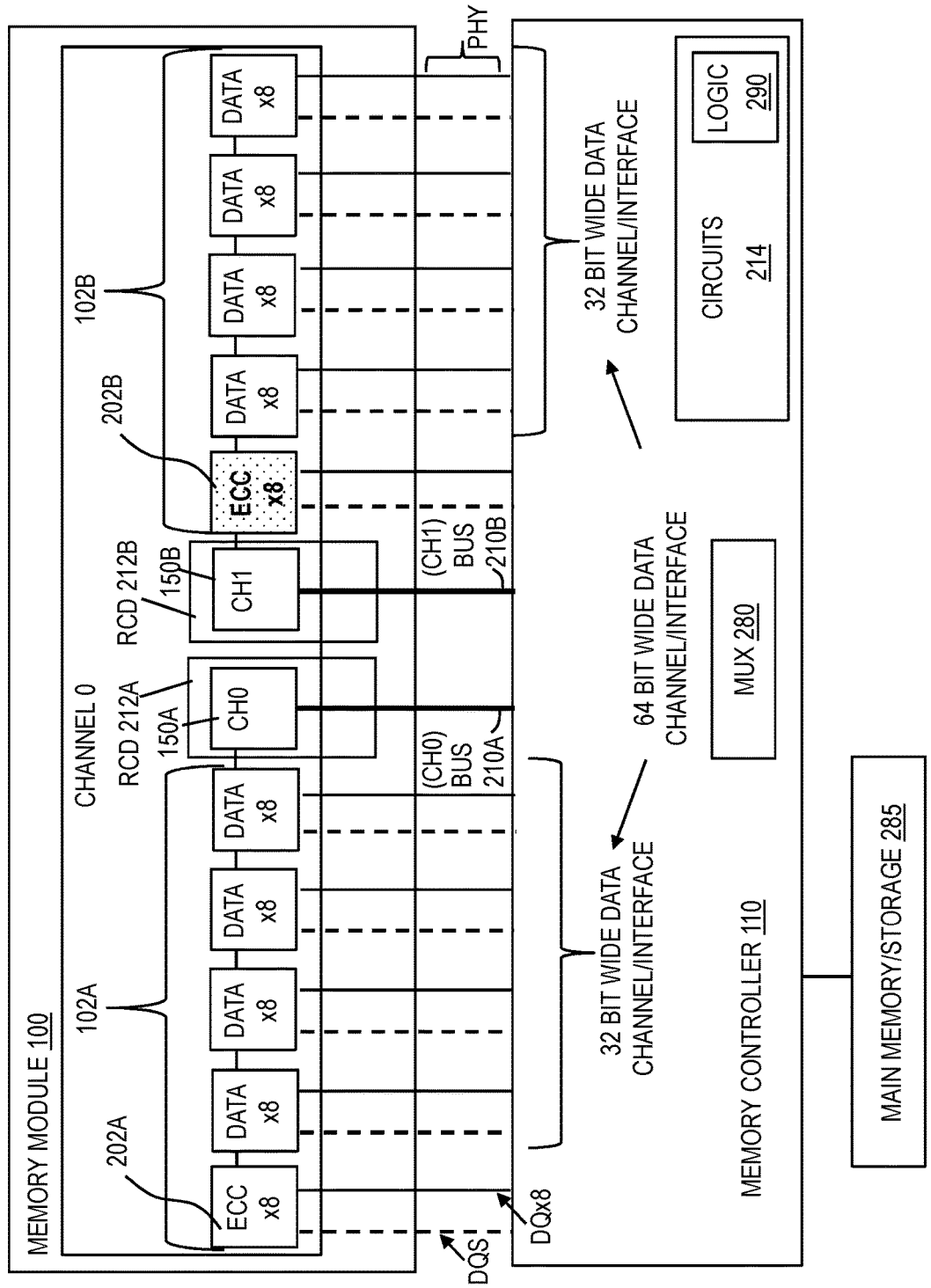
FIG. 3 is a schematic of a modified memory module connected to the modified memory controller according to embodiments.

FIG. 3 is a schematic of a modified memory module 100 connected to the modified memory controller 110 according to embodiments. FIG. 3 illustrates a case in which the memory module 100 has more than one RCD. In this case, the memory module 100 is depicted with two RCDs designated as RCD 212A and RCD 212B. The RCD 212A has the logic 150A for channel 1 while the RCD 212B has the logic for 150B for channel 2. Just as discussed herein, the memory controller 110 is configured to operate the memory module 100 in dual channel mode where command and address information issued on bus 210A to memory devices 102A (via logic 150A of RCD 212A) is independent of the command and address information issued on bus 210B to the memory device 102B (via logic 150B of RCD 212B). Independent means that one type of command such as a write command can be issued on CH0 bus 210A, while another type of command such as read command is concurrently issued on CH1 bus 210B. The memory controller 110 is configured to operate the memory module 100 in single channel mode where the same command and address information is issued on both busses 210A and 210B to the memory devices 102A and 102B via logic 150A and 150B of RCDs 212A and 212B.

The command address and data busses 210A and 210B can be singled ended or differential.

FIG. 4 is a flow chart 400 of a method for operating the memory controller 110 according to embodiments. At block 402, the memory controller 110 is configured to drive the first memory devices 102A and the second memory devices 102B in a dual channel mode, where a first error correction code (ECC) memory device 202A and a second ECC memory device 202B protect the first memory devices 102A and the second memory devices 102B.

At block 404, the memory controller 110 is configured to drive the first memory devices 102A and the second memory devices 102B in a single channel mode such that the second ECC memory device 202B is a spare memory device, where the first ECC memory device 202A protects the first memory devices 102A and the second memory devices 102B, where the memory controller 110 is configured to switch between the dual channel mode and the single channel mode.

The memory module 100 is dynamic random access memory (DRAM). The memory module is a DRAM dual in-line memory module (DIMM).

The first memory devices 102A include first data memory devices 102A configured for data storage and the first ECC memory device 202A configured for error correction. The second memory devices 102B include second data memory devices 102B configured for data storage and the second ECC memory device 202B configured for error correction. The memory controller 110 is configured to disable the second ECC memory device 202B during the single channel mode such that the second ECC memory device 202B is the spare memory device.

The memory controller 110 is configured to detect a failed memory device from the first memory devices 102A and the second memory devices 102B. The memory controller 110 is configured to replace the failed memory device with the spare memory device such that the spare memory device operates in place of the failed memory device in the memory module 100. In response to detecting the failed memory device, the memory controller 110 is configured cause the spare memory device to operate in place of any one of the first data memory devices 102A, the first ECC memory device 202A, and the second memory devices 102B.

The first data memory devices 102A have a 32-bit wide data interface and the second data memory devices 102B have another 32-bit wide data interface. During the single channel mode, the memory controller 110 is configured to cause the first ECC memory device 202A to protect a 64-bit wide data interface for both the first data memory devices 102A and the second data memory devices 102B, and the 64-bit wide data interface is a combination of the 32-bit wide data interface and the another 32-bit wide data interface. The first ECC memory device 202A is 8 bits, and the second ECC memory device 202B is 8 bits.

FIG. 5 is a flow chart 500 of a method of configuring a memory controller 110 according to embodiments. At block 502, the memory controller 110 is configured to operate in a dual channel mode, where operating in the dual channel mode includes driving two 32-bit data channels with 7 bits of error correcting code (ECC) memory (ECC memory devices 202A and 202B). Although the ECC memory devices 202A and 202B have 8 bits each, only 7bits of the 8 bits are needed in each of the ECC memory devices 202A and 202B.

At block 504, the memory controller 110 is configured to operate in a single channel mode, where operating in the single channel mode includes driving a single 64-bit channel with 8 bits of ECC memory (e.g., ECC memory device 202A) such that an 8 bit spare memory device (e.g., ECC memory devices 202B) is available, where the memory controller 110 does not concurrently operate in both the single channel mode and the dual channel mode.

FIG. 6 is a flow chart 600 of a method of switching from dual channel mode to single channel mode according to embodiments. At block 602, the memory controller 110 is configured to determine (e.g., via circuits 214 and logic 290) that a switch is needed from the dual channel mode (e.g., separately operating both channel 0 and channel 1) to the single channel mode of operating a memory module 100. The memory module 100 comprises memory devices 102A and 102B on a first channel (e.g., channel 0) and a second channel (e.g., channel 1).

At block 604, the memory controller 110 is configured to switch from the dual channel mode to the single channel mode (e.g., operating both channels 0 and 1 as a single channel 0), which comprises: reading out all data from the memory devices 102A and 102B of the memory module 100 (at block 606), loading the data from the memory devices 102A and 102B of the memory module 100 into a storage/main memory 285 (at block 608), causing a spare ECC memory device 202B of the memory devices to be available by protecting the first and second channels 0 and 1 with a single error correcting code (ECC) memory device 202A instead of two ECC memory devices (instead of both ECC memory devices 202A and 202B) of the memory devices 102A, 102B (at block 610), mapping input and output (e.g., via multiplexer network 280) of a failing memory device (e.g., one of the memory devices from either 102A of 102B) to the spare ECC memory device 202B such that intended writing to and reading from the failing memory device is instead written to and read from the spare ECC memory device 202B (at block 612), and writing the data from the storage 285 back to the memory devices 102A and 102B of the memory module 100 such that the part/portion of the data intended for the failing memory device is instead written to the spare ECC memory device 202B (at block 614).

The memory controller 110 is configured to determine that the switch is needed from the dual channel mode to the single channel mode of operating the memory module by recognizing that a predefined trigger occurs during operation in the dual channel mode in which no spare memory device is available on the memory module. The predefined trigger occurs when a single bit error rate on any one of the memory devices reaches a predefined threshold. The failing memory device causes the predefined trigger to occur.

Technical effects and benefits include a structure and method for providing a spare memory device from a standard memory module. Technical effects and benefits include a memory controller configured to run in either two 32-bit data channel with 7 bit ECC code and switch to a single 64-bit channel with 8 bit ECC code and an 8-bit spare memory device when using a standard DDRS DIMM. Further, technical benefits allow a memory module having no RAS (i.e., no spare memory device) originally designed for low end computers to be utilized as a memory module with RAS (i.e., with a spare memory device) for high end computers.

Figure 7:
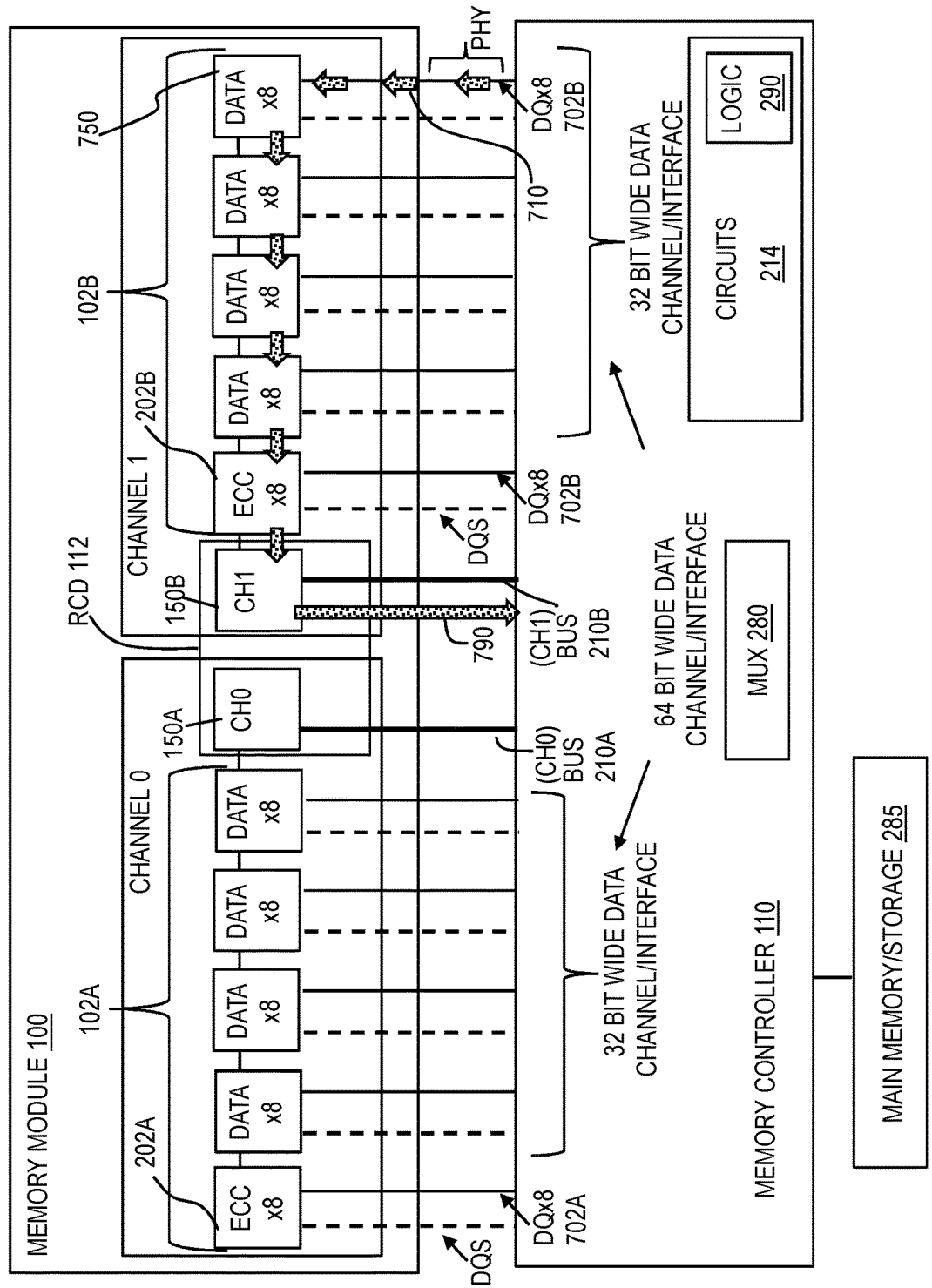
FIG. 7 is a schematic of a memory module connected to a memory controller according to embodiments.

FIG. 7 is a schematic of the memory module 100 connected to a memory controller 110 according to embodiments of the invention. DDR5 Memory Interface Speeds will reach 3200-6400 million transfers per second. At these high speeds, new methods need to be employed to handle signal integrity concerns, and Decision Feedback Equalization (DFE) circuits are being used in the DRAM receivers to better detect signal transitions. The DFE circuits and/or logic programming are in each of the memory devices 102A and 102B and in the RCD 112 (including RCDs 212A and 212B). The DFE circuit is a filter which uses feedback of detected signal transitions (also known as symbols) to create an estimate of the channel output. The symbols (which are communication signals) that arrived previously are fed back into the DFE circuit and compared to symbols at the output of the receiver or linear equalizer. Performing this comparison allows the DFE circuit to produce a reliable estimate of incoming symbols on the transmission line. For proper test and characterization of the DFE circuits, there is a mechanism in place to observe the DFE output. A technique is to have a feedback path that would daisy chain through the DRAM devices back to the RCD. The feedback path continues through the RCD to the memory controller. This feedback path allows any DQ's receiver (which is the receiver in each memory device 102A and 102B) to be multiplexed (muxed) into the feedback path and traverses through the other DRAM memory devices back to the memory controller to observe the output of the DFE circuit. Each memory device 102A and 102B has a DQ receiver for receiving command signals as understood by one skilled in the art.

Taking channel 1 as an example (which equally applies to channel 0), each memory device 102B (each DRAM) in the chain has feedback enabled (by the memory controller 110) and a signal selected to feedback so that the memory controller 110 creates the daisy chain to create the feedback loop. For example (in channel 1), feedback signals can include observation of any memory device 102B (DQ for the DRAM ×4, ×8, ×16, etc.) and pass through of the feedback from another DRAM. In this example, memory device 750 is highlighted as one of the memory devices 102B of channel 1. The memory device 750 is being observed in observation mode and the other memory devices 102B are in pass through mode to pass the feedback signal 710 up the DQ×8 702B from the memory device 750 to the other memory devices 102B (in between the RCD 112), and then pass the feedback signal 710 down feedback path 790. FIG. 7 shows an example in which feedback is enabled in logic 150B of channel 1 in RCD 112.

It is noted that the memory devices 102A have their own DQ×8 702A and the memory device 102B have their own DQ×8 702B. The memory controller 110 can turn on feedback in any of the memory device 102A in channel 0 and/or memory devices 102B in channel 1 and in the RCD 112.

Figure 8:
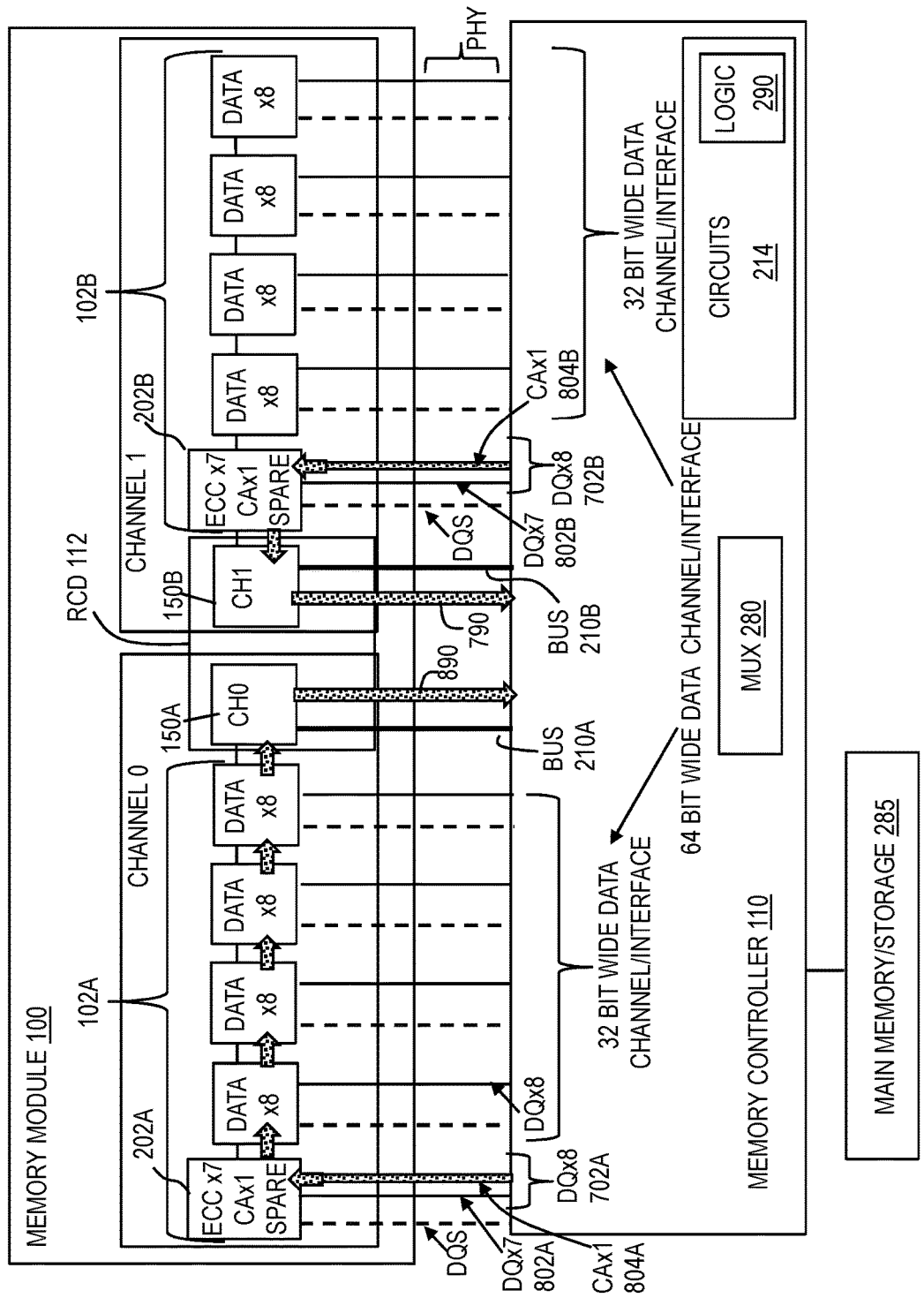
FIG. 8 is a schematic of the memory module connected to a memory controller illustrating command address recovery according to embodiments.

Now, discussion of command address recovery is provided which provides a technique to find a bad bit (i.e., bad lane) on the command address bus 210A or 210B. FIG. 8 is a schematic of the memory module 100 connected to a memory controller 110 illustrating command address recovery according to embodiments of the invention. FIG. 8 illustrates command address recovery using ECC memory device 202A or using ECC memory device 202B, but it should be appreciated that non-ECC memory devices 102A or 102B can be utilized as well. As noted herein, ECC coding on a 32 bit channel requires 7 bits of ECC which leaves one extra DQ per channel (i.e., one extra or spare lane) on the dual channel. This allows for one DQ to be left in feedback mode during normal operation on each channel. For example, ECC memory device 202A has DQ'8 (DQ by 8) 702A which has 8 lanes or 8 bits for communicating with the memory controller 110. Since only 7 bits of ECC are needed to cover 32 bits of data memory devices 102A in channel 0, 1 bit or 1 lane is left as a spare lane that can be utilized for command address recovery. Accordingly, the bus DQ×8 702A is shown as having DQ×7 802A (DQ by 7) and CA×1 804A (command address by 1) which equal 8 bits or 8 lanes. Similarly, ECC memory device 202B has DQ×8 (DQ by 8) 702B which has 8 lanes or 8 bits for communicating with the memory controller 110. Since only 7 bits of ECC are needed to cover 32 bits of data memory devices 102B in channel 1, 1 bit or 1 lane is left as a spare lane that can be utilized for command address recovery. Accordingly, the bus DQ×8 702B is shown as having DQ×7 802B (DQ by 7 ) and CA×1 804B (command address by 1) which equal 8 bits or 8 lanes.

FIG. 8 shows that memory devices, which are ECC memory device 202A and/or ECC memory device 202B, are free to be placed into feedback mode. In channel 0, the feedback path can be from memory controller 110 to CA×1 804A, through intervening memory devices 102A, to RCD 112, back down feedback path 890. In channel 1, the feedback path can be from memory controller 110 to CA×1 804B, through any intervening memory devices 102B (if present but none are intervening in this example), to RCD 112, and back down feedback path 790.

An example scenario for command address recovery (i.e., command address lane/bit determination) is illustrated below. In the state-of-the-art, command address signals are sent over CA bus 210A to RCD 112 for memory devices 102A in channel 0 and command address signals are sent over CA bus 210B to RCD 112 for memory devices 102B in channel 1. Consider if one of the CA (command address) signals fails, as detected by a parity check. The memory devices (e.g., memory devices 102A or 102B) on that channel will no longer be accessible. Embodiments of the invention are provided to discuss techniques for using the feedback feature as a single CA lane spare. The goal is to recover the data from the DIMM memory channel that failed (which can be channel 0 or channel 1) and from the good memory channel that did not fail. After data recovery, the memory channel can be disabled until repairs are made, and/or the broken channel may be used in a reduced function mode. The feedback path only works in one direction, for example, from memory controller 110 to DRAM memory devices (memory devices 102A for channel 0 and/or memory devices 102B for channel 1), then to RCD 112, and back to controller 110. This requires that the memory channel with the feedback path enabled also (only) works in one direction. In feedback mode, the DQ line can (only) send data from the memory controller to the memory device (the DQ I/O in the memory device is in receive only mode). In normal operation mode, the DQ I/O can transmit or receive data depending on whether a read or write command has been issued to the memory device. Therefore, prior to entering feedback mode for the good channel, all data should be read out and stored. The channel with the failing CA lane is placed into normal operational mode. Normal operation mode is for reading and writing data to the memory devices in the particular channel. The good channel secures the data by putting its memory devices into self-refresh or reading out the data and storing it elsewhere. The good channel is placed into feedback mode (one DQ lane on the good interface is chosen for the feedback to the RCD and back to the memory controller). The memory controller 110 (iteratively) maps a selected CA lane of the bad command address onto the DQ lane chosen for the feedback and determines the bad lane of the command address based on which of the selected CA lanes (having its commands duplicated on the DA lane) returns with a passing parity check.

Figure 9:
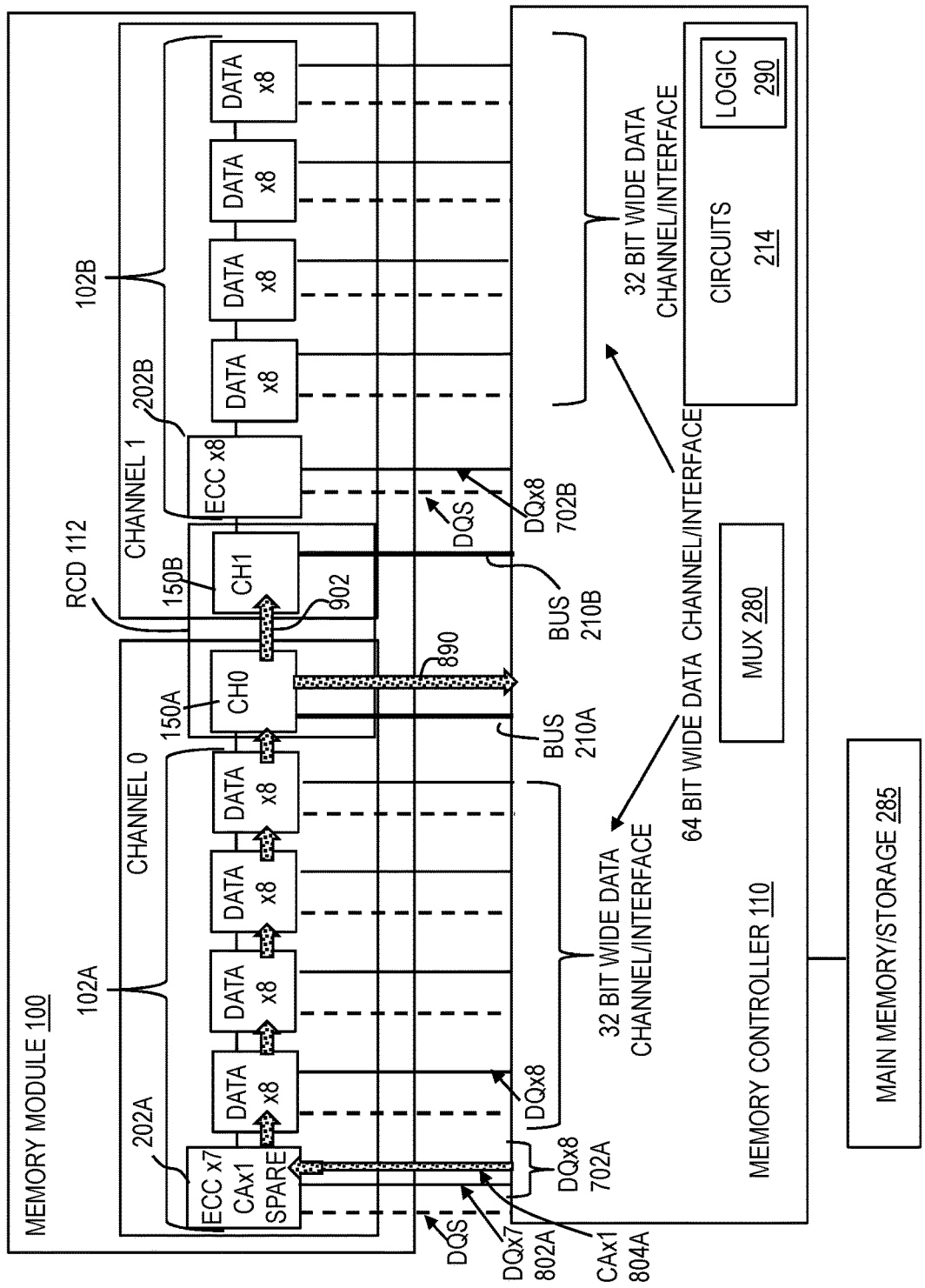
FIG. 9 is a schematic of the memory module connected to a memory controller illustrating command address recovery according to embodiments.

To further illustrate this scenario, FIG. 9 is a schematic of the memory module 100 connected to a memory controller 110 illustrating command address recovery according to embodiments of the invention. FIG. 9 depicts an example in which one channel is good and the other channel is bad.

For explanation purposes, FIG. 9 depicts DIMM channel 0 (CH0) as good and DIMM channel 1 as being bad with a command address fail on channel 1 (CH1). The memory controller 110 is configured to shut down good channel 0 and the data in memory devices 102A of channel 0 will be secured. For example, the data of memory devices 102A in channel 0 can be stored in main memory/storage 285 by the memory controller 110. To secure the data, the memory devices 102A can be placed into self-refresh or the data can be read from the DIMM channel 0 and saved elsewhere. The memory controller 110 is configured to place channel 0 into feedback mode where one DQ (one lane/bit labeled as CA×1) of a selected memory device 102A is routed to the RCD 112. In FIG. 9, CA CH1 bus 210B is bad and CA bus 210B has, for example, 20 bits (i.e., 20 lanes) which are bits/CA lanes 0-19. A parity check in the RCD 112 indicates to the memory controller 110 that there was an error or a fail in the CA CH1 bus 210B. However, the parity check does not identify the exact bit/lane of the bits/lanes 0-19 that have failed, and the memory controller 110 is configured to perform command address recovery to determine the bad bit/lane of bits/lanes 0-19 in the CA CH1 bus 210B. In FIG. 9, the DQ×8 702A includes DQ×7 802A representing 7 bits/lanes and CA×1 804A representing 1 bit/lane. The 1 bit/lane of CA×1 804A is used for duplicating commands from a selected bit/lane of the 0-19 bits/lanes of the bad CA bus 210B.

FIG. 9 illustrates ECC memory device 202A as the observed memory device within 102A (in feedback mode) while the remaining memory devices 102A (between the observed memory device and the RCD 112) are placed in feedback pass through mode by the memory controller 110. The ECC memory device 202A as the observed memory device 102A receives the commands while the remaining 4 memory devices 102A in feedback pass through mode pass the commands to the RCD 112. The bad channel 1 is operated in normal operation mode while the good channel 1 is operated in feedback mode. The memory controller 110 sends commands on the 0-19 bits/lanes of the bad CA bus 210B to channel 1 (logic 150B) and the parity check indicates a parity fail. The memory controller 110 duplicates the commands of a selected bit/lane of the 0-19 bits/lanes of the bad CA bus 210B and sends the duplicated commands of the selected bit/lane on the CA×1 lane/bit 804A of the ECC memory device 202A. It can be assumed that bit/lane 0 (of bits/lanes 0-19 in the bad CA bus 210B) is initially the selected bit/lane. The duplicated commands are passed through the intervening memory devices 102A (in feedback pass through mode) to reach (CH1 logic 150B) the RCD 112 via bus 902, while all of the commands have been sent on CA bus 210B to (CH1 logic 150B) the RCD 112. The bus 902 between channels 0 and 1 is activated by the memory controller 110 for command address recovery. The memory controller 110 instructs the RCD 112 (CH1 logic 150B) to multiplex the duplicated commands (of bit/lane 0) received on the CA×1 bit/lane 804A with the commands received on bits/lane 1-19 of CA bus 210B in place of any commands received on selected bit/lane (e.g., selected bit/lane 0) of CA bus 210B, such that the RCD 112 (logic 150B) performs a parity check using the duplicated commands received on the CA×1 bit/lane 804A in place of any commands on selected bit/lane (e.g., selected bit/lane 0). If the parity check passes, then the initially selected bit/lane (e.g., bit/lane 0) of the bits/lanes 1-19 of CA bus 210B is the bad bit/lane. If the parity check fails, the memory controller 110 is configured to move to the next bit/lane of bits/lanes 0-19 as the selected bit/lane (e.g., bit/lane 1), duplicate the commands of the (next) selected bit/lane on the CA×1 804A, and receive the results of the parity check using the duplicated commands sent on CA×1 804A in place of the selected bit/lane. If the parity check passes, then the memory controller 110 determines that the next selected bit/lane (e.g., bit/lane 1) is bad on the CA bus 210B. On the other hand, if the parity check fails, then the memory controller 110 determines that the next selected bit/lane is not bad, and the memory controller 110 moves to the next bit/lane as the selected bit/lane (e.g., bit/lane 2). This process continues until each of the bits/lanes 0-19 of the CA bus 210B has been tested, which will result in the identification of the bad bit/lane.

Figure 10:
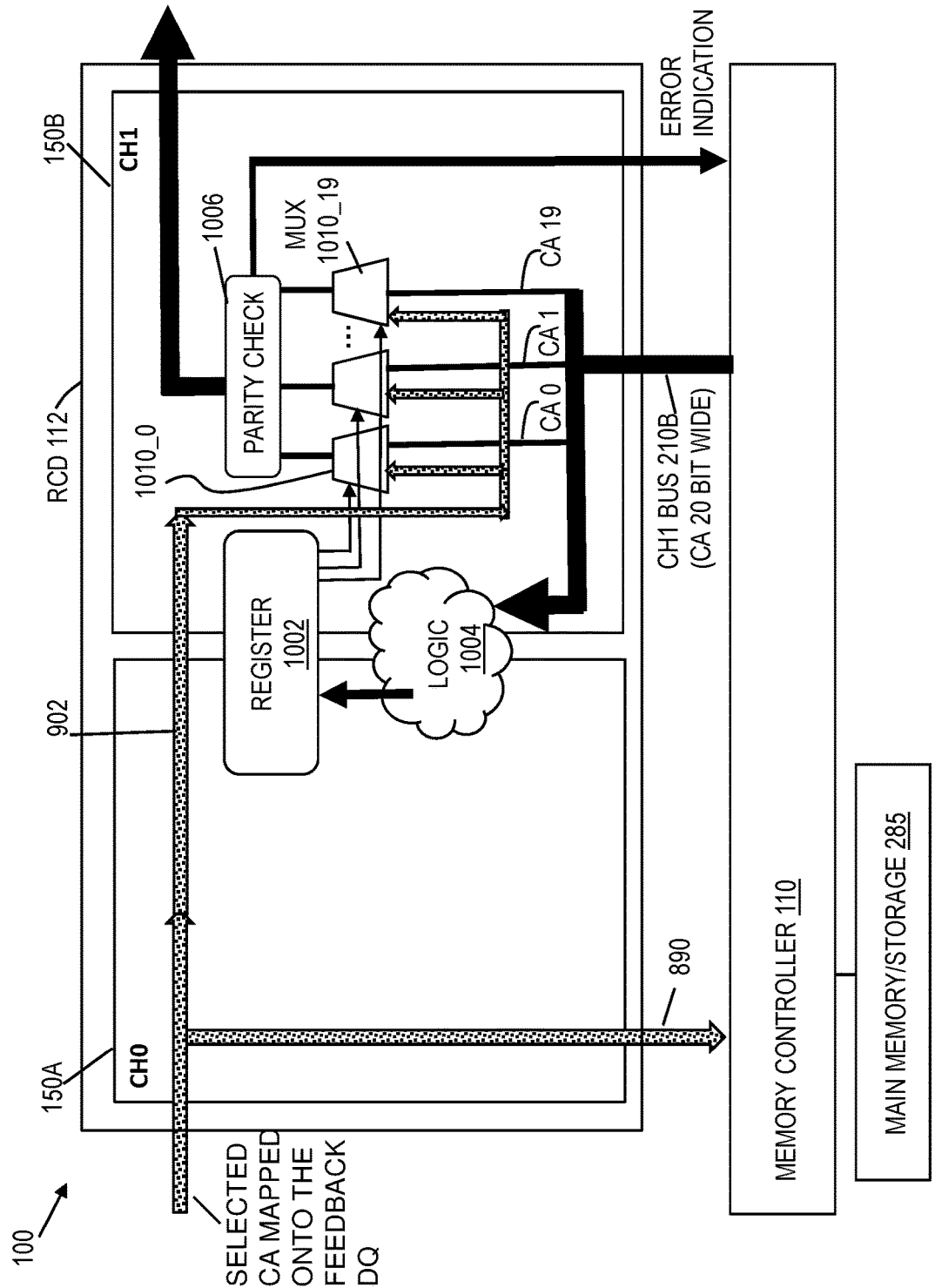
FIG. 10 is a schematic of the memory module connected to the memory controller illustrating command address recovery according to embodiments.

To further illustrate command address recovery, FIG. 10 is a schematic of the memory module 100 connected to the memory controller 110 illustrating command address recovery according to embodiments of the invention. In FIG. 10, example internal details of the memory module 100 are illustrated, while other details of the memory module 100 and memory controller 110 may be omitted for the sake of clarity. Particularly, FIG. 10 shows modifications to the RCD 112 utilized in command address recovery. Because the example scenario is for a good channel 0 and bad channel 1, the paths, devices, and logic are shown for channel 1, but it is noted that the same paths, devices, and logic apply equally to both channels. It should be appreciated that the paths, devices, and logic are present and analogously implemented in channel 0, although not shown so as not to obscure the figures. The path 902 depicts a new path that routes the channel 0 feedback path to the channel 1 side of the RCD 112. The channel 1 CA bus 210B extending from the memory controller 110 has a multiplexer (mux) 1010_0-1010_19 on each input signal (from bits/lanes 0-19 of channel 1 CH1 bus 210B) to select between commands received on any one of the bits/lanes 0-19 and the feedback path (duplicated command signal sent on CA×1 804A). A register 1002 has been added to allow programming of the RCD 112 by the memory controller 110 to select a CA signal (i.e., on the selected bit/lane) to be overridden by the channel 0 feedback path (i.e., use the duplicated command signal sent over the CA×1 804A of the feedback path in place of the command signal sent on the selected bit/lane of 0-19 bits/lanes of the CH1 CA bus 210B).

Continuing the scenario of the good channel 0 and bad channel 1, the memory controller 110 is configured to duplicate the command signal of the selected bit/lane (e.g., selected bit/lane 0) such that the duplicated command signal is sent on the CA×1 804A of, e.g., the ECC memory device 202A and the regular command signals are sent on the bits 0-19 of the CH1 CA bus 210B (including the command signal of the selected bit/lane that has been duplicated) as discussed above. The command signals (commands) sent on bits/lanes 0-19 of CH1 CA bus 210B are each sent to their respective one of the multiplexers 1010_0-1010_19. For example, the command signal on bit/lane 0 of CH1 CA bus 210B is sent to multiplexer 1010_0, the command signal on bit/lane 1 of CH1 CA bus 210B is sent to multiplexer 1010_1, and so forth, through the command signal on bit/lane 19 is sent to multiplexer 1010_19. Assuming that the selected bit/lane is initially bit/lane 0 having its command signal (i.e., commands) duplicated, the duplicated command signal is sent on the CA×1 804A of ECC memory device 202A through any intervening memory devices 102A until the duplicated command signal reaches the RCD 112 (from the left side) as shown in FIG. 10. The duplicated command signal travels bus 902 to cross from the logic 150A (circuit) of CH0 to the logic 150B (circuit) of CH1. The RCD 112 has the programmable register 1002 which is configured to select which CA bit/lane to remap, and the register 1002 is programmed/instructed by the memory controller 110. Logic 1004 represents software logic and/or circuit logic used by the memory controller 110 to program the register 1002 according to which bit/lane is to be replaced during testing. The register 1002 controls both channels, although channel 1 is illustrated for explanation purposes. The register 1002 is configured to send a 0 (no selection) or 1 (select the remap) to the multiplexers 1010_0-1010_19. Sending a 0 by the register 1002 means that the particular multiplexer operates normally by passing the command signal received on the bit/lane of CH1 CA bus 210B. Sending a 1 by the register 1002 means that the particular multiplexer is to select the duplicated command signal from the feedback path, such as from CA×1 804A, in place of the command signal on the selected bit/lane of CH1 CA bus 210B. Continuing the example scenario, the memory controller 110 instructs the register 1002 to cause the multiplexer 1010_0 to select the duplicated command signal from the feedback path (which was sent on CA×1 804A) in place the command signal sent on bit/lane 0 of CA bus 210B. As instructed by the memory controller 110, the remaining multiplexers 1010_1-1010_19 operate normally and select commands signal on bits/lanes 1-19 of CA bus 210B. A parity checker 1006, which may be circuits for logic gates, comparators, etc., is configured to receive commands signals output from multiplexers 1010_0-1010_19 and check the parity of the (combined)

commands signals. If the parity check passes when the duplicated command signal is selected, this means that the bit/lane that was the selected bit/lane and that had its command signal replaced by the duplicated command signal is bad, i.e., bit/lane 0 of CA bus 210B is bad which had its command signal replaced by the duplicated command signal sent on CA×1 804A. If the parity check fails (e.g., error sent to memory controller 110) when the duplicated command signal is selected, this means that the bit/lane that was the selected bit/lane is not bad, i.e., bit/lane 0 of CA bus 210B is not bad. When the (initial or any) selected bit/lane is not bad, the memory controller 110 is configured to move to the next bit/lane of CA bus 210B as the selected bit/lane (e.g., mover to bit/lane 1 of bits 0-19), and the process continues until all bits 0-19 of the of CA bus 210B have been duplicated and tested.

The command address bus (CA bus 210A and CA bus 210B) is parity protected, and if there is a parity fail, the RCD 112 will indicate the fail to the memory controller 110. The memory controller 110 will then stop sending traffic to both channels (CH0 and CH1), and command address recovery is initiated by the memory controller 110 in order to determine the bad bit/lane on the command address bus as discussed herein.

Turning to calibration of the feedback path used to send the duplicated command signal from the memory command address recovery, the memory controller 110 is configured to calibrate the feedback path to the same timing as (bad) CA bus. This calibration is so that the duplicated command signal will reach the multiplexers 1010_0-1010_19 at about the same time that the commands signals on bits/lanes 0-19 of the CA bus reach the multiplexers 1010_0-1010_19. An example calibration algorithm is discussed below but is should be appreciated that other calibration algorithms can be used. The memory controller 110 is configured to enable the feedback path, and this means that one memory device is in observe mode, other DRAMs memory devices between the observing memory device and the RCD 112 are put into the pass through mode, and the RCD is placed into feedback. The memory controller 110 is configured to send a pattern to the observed DQ lane and wait for that pattern to return on the feedback path from the RCD 112. When the pattern returns, the memory controller 110 knows the latency of the feedback path. The memory controller 110 can then subtract the known timing of the CA path to the RCD to determine how long it will take a CA signal to arrive at the RCD 112 through the feedback path. The memory controller 110 then knows it will need to use this timing relationship to properly align the CA sent on the normal CA bus to the CA signal (i.e., duplicated command signal) being sent through the feedback path.

As an example of calibration, FIG. 11 is a schematic of the memory module 100 connected to the memory controller 110 illustrating calibration in preparation for command address recovery according to embodiments of the invention. FIG. 11 shows a simplified version of the memory controller 110. Continuing the example scenario of channel 0 being good and channel 1 being bad, the memory controller 110 enables the feedback path by placing ECC memory device 202A in observation mode, placing other intervening memory devices 102A between the observing memory device and the RCD 112 into the pass through mode, and placing the RCD 112 into feedback. The memory controller 110 sends pattern X on the CA×1 lane 804A to the ECC memory device 202A to determine how long it takes for the pattern X to return to the memory controller 110. The memory controller 110 can be configured to count the clock cycles until the memory controller 110 detects the pattern X from the RCD 112 on feedback path 890. The memory controller 110 can be connected to a processor to count the clock cycles or to a counting circuit (e.g., counter). For explanation purposes, it is assumed that the detection of pattern X takes 10 clock cycles. The memory controller 110 is configured to now subtract the number of cycles it takes pattern X to travel from the RCD 112 to the memory controller 110 and this is a known (predefined) in advanced based on system design. It is assumed that it takes 2 cycles (between RCD 112 to the memory controller 110) because the routes should be matched closely to the CA signals sent on bus 210A. As such, the memory controller 110 determines it takes 8 cycles (10−2=8) for a CA signal (calibrated using pattern X) to reach the RCD 112 through the feedback path. If the normal CA path (sent on CA bus 210B) is 2 cycles and the feedback path is 8 cycles, then the memory controller 110 will send a CA signal on the feedback path (i.e., duplicated command signal on) 6 cycles earlier than the CA signals on the normal CA bus (i.e., bad CA bus 210B) for them all to arrive at the same time in the RCD 112 (i.e., arrive at the multiplexers 1010_0 -1010_19).

FIG. 12 is a flow chart 1200 of detecting which CA lane that a fail occurred on according to embodiments of the invention. A fail has occurred on CA bus 210B as indicated by the failed parity check, and calibration has been performed in advance. Accordingly, the memory controller will then detect which CA lane the fail took place on. It is assumed that channel 0 is good and channel 1 is bad.

At block 1202, the memory controller 110 is configured to enable the feedback mechanism in the ECC memory device 202A for the extra DQ, and all other memory devices between the ECC memory device 202A and the RCD 112 will be placed into the feedback pass through mode creating a daisy chain of devices.

At block 1204, the memory controller 110 is configured to repeat the sequence of commands of the CA signals (on the bad CA bus 210B) that led up to the fail while duplicating one of the CA signals onto the spare DQ (i.e., the CA×1 804A). Prior to starting the command sequence, the memory controller 110 is configured to program the RCD 112 (e.g., the register 1002) such that the RCD 112 will know which CA signal is being duplicated.

At block 1206, the RCD 112 will check for parity fails across the CA bus initially without using the duplicated CA signal (or vice versa initially using the duplicated command in place of the command signal on the selected bit/lane). If the parity check passes using the failing command sequence on the original CA bus (e.g., on the bad CA bus 210B), a pass counter is incremented in block 1211, and this pass at block 1206 indicates an intermittent fail (also known as a soft fail). By resulting in a pass at block 1206, this means that the bad CA bus 210B may not be bad and the (original) fail that caused the test is an intermittent fail such as a timing issue.

At block 1208, if there is a fail, the RCD 112 will check the parity again with the duplicated CA signal, along with the other CA signals except the CA signal sent on the selected bit/lane of the CA bus 210B, to see if parity is good. If the parity is good (passes) with the duplicated CA signal, then the selected bit/lane of CA bus 210B having its CA signal duplicated is bad. If the parity is not good (fails) with duplicated CA signal, then the duplicated signal is not the bad CA signal meaning that the selected bit/lane of CA bus 210B having its signal duplicated is not bad.

At block 1210, another CA signal is selected to be duplicated meaning that another bit/lane of bit lanes 0-19 of CA bus 210B is selected as the selected bit/lane, and the process is repeated until good parity is found. Each time bad parity is found, the flow returns to block 1204.

When there remaining bad parity and the memory controller 110 has tried duplicating all CA signals (duplicating the CA signals on all bits 0-19), the memory controller determines there is a complete fail of the CH1 CA bus 210B, and the memory controller 110 can then turn off the command channel 1.

When good parity was found, the memory controller 110 can operate the memory module 100 using while duplicating the CA bit that was found to be faulty, such that CA signals for the faulty (bad) bit/lane are sent over spare CA×1 804A. As noted above, only 7 bits (i.e., lanes) of ECC are needed and these leaves 1 additional bit/lane. This spare bit/lane of ECC memory device 202A or ECC memory device 202B can be utilized to send the duplicated signal during normal operation of the channels 0 and 1 (not just feedback). In addition, because the data on the good channel 0 has been backed up, channel 0 may be left in feedback mode where any DQ bit can be used to map the failing CA 210B to the RCD 112. In this state, all of the data from channel 1 can be recovered.

It is noted that the number of commands to repeat at block 1204 can be programed and is according to the memory controller design. It may be beneficial to disable the command address forwarding to the DRAMs during this time. This can be achieved by simple register control word writes to the RCD 112.

Also, it is noted that the command address recovery works for single channel mode with ECC and spare. In this case, the function of the CA recovery mechanism would be similar to the dual channel mode, with the following changes. Because the DIMM memory module 100 is operating in single channel mode, in order for the memory controller 110 to recover the data it would switch into dual channel mode and retrieve data from the good side (good channel 0) of the DIMM. Next, the memory controller 110 would go into recovery mode for the other side (bad channel 1) as discussed above.

FIGS. 13A and 13B depict a flow chart 1300 of a method for operating a memory controller 110 according to embodiments of the invention. At block 1302, the memory controller 110 receives detection of an error on a command address bus (e.g., CH1 CA 210B) coupled to memory interface buffer (e.g., a register clock device (RCD) 112), the RCD being configured to communicate with first memory devices 102A of a first channel and second memory devices 102B of a second channel, the command address bus 210B comprising 1-N bit lanes, the command address bus being for the second channel.

At block 1304, the memory controller 110 initiates a feedback mode in the first memory devices 102A of the first channel and the RCD 112, such that an identified one of the first memory devices (e.g., ECC memory device 202A) comprises an identified bit lane (e.g., CA×1 804A) on a data bus (e.g., DQ×8 702A) to be utilized for testing.

The memory controller 110 is configured to perform a process comprising: sending commands on the 1-N bit lanes of the command address bus (e.g., CA bus 210B) to the RCD 112 and duplicating commands designated for a selected one of the 1-N bit lanes (e.g., selected bit/lane 0) at block 1306, sending the duplicated commands to the identified bit lane (e.g., CA×1 804A) of the data bus such that the identified memory device (ECC memory device 202A) passes the duplicated commands to the RCD 112 at block 1308, receiving a result of a parity check (from parity checker 1006) for the commands sent on the 1-N bit lanes, such that when the result is a pass the process ends at block 1310.

When the result is a fail, the memory controller 110 is configured to cause/instruct checking a duplicated parity check using the duplicated commands sent on the identified bit lane (e.g., CA×1 804A) in place of the selected one of the 1-N bit lanes (e.g., selected bit/lane 0) and using the commands sent on the 1-N bit lanes except for the selected one of the 1-N bit lanes at block 1312. When the duplicated parity check is a pass using the duplicated commands on the identified bit lane, the memory controller 110 is configured to determine that the selected bit lane (e.g., selected bit/lane 0) is bad and end the testing process at block 1314. When the duplicated parity check is a fail, the memory controller 110 is configured to select a next one of the 1-N bit lanes as the selected one (e.g., next selected bit/lane 1) and repeat the process at block 1316.

Checking the duplicated parity check using the duplicated commands sent on the identified bit lane in place of the selected one of the 1-N bit lanes and using the commands sent on the 1-N bit lanes except the selected one of the 1-N bit lanes comprises replacing any commands on the selected one of the 1-N bit lanes with the duplicated commands.

Selecting the next one of the 1-N bit lanes as the selected one and repeating the process comprises continuously iterating to another one of the 1-N bit lanes not previously tested as the selected one until good parity is found.

The memory controller 110 is configured to recover data from the first memory devices 102A of the first channel prior to initiating the feedback mode in the first memory devices of the first channel and the RCD 112, assuming the first channel (channel 0) is good and the second channel (channel 1) has the bad command address bus.

The memory controller 110 causes a multiplexer (e.g., one of the multiplexer 1010_0 -1010_19 at a time) to select the duplicated commands sent on the identified bit lane in place of any commands sent on the selected one of the 1-N bit lanes in order to perform the duplicated parity check. Each bit/lane 0-19 is connected to its own multiplexer.

The second memory devices 102B of the second channel (e.g., channel 1) comprise an ECC memory device 202B, the ECC memory device having an ECC data bus (e.g., DQ×8 702B). A spare bit lane (1 bit/lane) of the ECC data bus is available, while remaining bit lanes (7 bits/lanes) of the ECC memory device are utilized for error correcting code protecting the second memory devices 102B. When the duplicated parity check is a pass using the duplicated commands on the identified bit lane, the memory controller 110 is configured to replace the selected one (e.g., bit/lane 0) of the 1-N bit lanes with a spare bit lane of an ECC memory device (e.g., 1 bit/lane of ECC memory device 202B (or ECC memory device 202A)). The spare bit lane of the ECC memory device is used during normal operation of the second channel to communicate with the RCD 112 in place of the selected one (e.g., bit/lane 0) of the 1-N bit lanes of the CA bus 210B.

The memory controller 110 is configured to changing from a single channel mode (e.g., in FIG. 2 or 3) back to a dual channel mode prior to performing the testing process (i.e., prior to performing command address recovery discussed herein).

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for operating a memory controller, the method comprising:
    receiving, by the memory controller, detection of an error on a command address bus coupled to a memory interface buffer, the memory interface buffer being configured to communicate with first memory devices of a first channel and second memory devices of a second channel, the command address bus comprising 1-N bit lanes, the command address bus being for the second channel;

initiating, by the memory controller, a feedback mode in the first memory devices of the first channel and the memory interface buffer, such that an identified memory device of the first memory devices comprises an identified bit lane on a data bus to be utilized for testing;

performing a process comprising:
  sending commands on the 1-N bit lanes of the command address bus to the memory interface buffer and duplicating commands designated for a selected one of the 1-N bit lanes;
  sending the duplicated commands to the identified bit lane of the data bus such that the identified memory device passes the duplicated commands to the memory interface buffer;
  receiving a result of a parity check for the commands sent on the 1-N bit lanes, such that when the result is a pass the process ends;
  when the result is a fail, checking a duplicated parity check using the duplicated commands sent on the identified bit lane in place of the selected one of the 1-N bit lanes and using the commands sent on the 1-N bit lanes except the selected one of the 1-N bit lanes;
  when the duplicated parity check is a pass using the duplicated commands on the identified bit lane, determining that the selected one is bad and ending the process; and
  when the duplicated parity check is a fail, selecting a next one of the 1-N bit lanes as the selected one and repeating the process.

2. The method of claim 1, wherein checking the duplicated parity check using the duplicated commands sent on the identified bit lane in place of the selected one of the 1-N bit lanes and using the commands sent on the 1-N bit lanes except the selected one of the 1-N bit lanes comprises replacing any commands on the selected one of the 1-N bit lanes with the duplicated commands.

3. The method of claim 1, wherein selecting the next one of the 1-N bit lanes as the selected one and repeating the process comprises continuously iterating to another one of the 1-N bit lanes not previously tested as the selected one until good parity is found.

4. The method of claim 1, further comprising recovering data from the first memory devices of the first channel prior to initiating the feedback mode in the first memory devices of the first channel and the memory interface buffer.

5. The method of claim 1, wherein the memory controller causes a multiplexer to select the duplicated commands sent on the identified bit lane in place of any commands sent on the selected one of the 1-N bit lanes in order to perform the duplicated parity check.

6. The method of claim 1, wherein at least one ECC memory device is included in the second memory devices of the second channel, the at least one ECC memory device having an ECC data bus; and
  wherein at least one spare bit lane of the ECC data bus is available, while remaining bit lanes of the ECC data bus are utilized for storing data and error correcting code for the second memory devices.

7. The method of claim 6, further comprising, when the duplicated parity check is a pass using the duplicated commands on the identified bit lane, replacing the selected one of the 1-N bit lanes with the at least one spare bit lane of the ECC data bus, such that the at least one spare bit lane of the at least one ECC memory device is used during normal operation of the second channel to communicate with the memory interface buffer in place of the selected one of the 1-N bit lanes.

8. The method of claim 1, further comprising changing from a single channel mode to a dual channel mode prior to performing the process.

9. A memory controller comprising:
  a circuit configured to control a memory module, the circuit being operable to perform operations comprising:
  receiving, by the circuit, detection of an error on a command address bus coupled to a memory interface buffer, the memory interface buffer being configured to communicate with first memory devices of a first channel and second memory devices of a second channel, the command address bus comprising 1-N bit lanes, the command address bus being for the second channel;
  initiating, by the circuit, a feedback mode in the first memory devices of the first channel and the memory interface buffer, such that an identified memory device of the first memory devices comprises an identified bit lane on a data bus to be utilized for testing;
  performing a process comprising:
    sending commands on the 1-N bit lanes of the command address bus to the memory interface buffer and duplicating commands designated for a selected one of the 1-N bit lanes;
    sending the duplicated commands to the identified bit lane of the data bus such that the identified memory device passes the duplicated commands to the memory interface buffer;
    receiving a result of a parity check for the commands sent on the 1-N bit lanes, such that when the result is a pass the process ends;
    when the result is a fail, checking a duplicated parity check using the duplicated commands sent on the identified bit lane in place of the selected one of the 1-N bit lanes and using the commands sent on the 1-N bit lanes except the selected one of the 1-N bit lanes;
    when the duplicated parity check is a pass using the duplicated commands on the identified bit lane, determining that the selected one is bad and ending the process; and
    when the duplicated parity check is a fail, selecting a next one of the 1-N bit lanes as the selected one and repeating the process.

10. The memory controller of claim 9, wherein checking the duplicated parity check using the duplicated commands sent on the identified bit lane in place of the selected one of the 1-N bit lanes and using the commands sent on the 1-N bit lanes except the selected one of the 1-N bit lanes comprises replacing any commands on the selected one of the 1-N bit lanes with the duplicated commands.

11. The memory controller of claim 9, wherein selecting the next one of the 1-N bit lanes as the selected one and repeating the process comprises continuously iterating to another one of the 1-N bit lanes not previously tested as the selected one until good parity is found.

12. The memory controller of claim 9, wherein the circuit is operable to recover data from the first memory devices of the first channel prior to initiating the feedback mode in the first memory devices of the first channel and the memory interface buffer.

13. The memory controller of claim 9, wherein the circuit causes a multiplexer to select the duplicated commands sent on the identified bit lane in place of any commands sent on the selected one of the 1-N bit lanes in order to perform the duplicated parity check.

14. The memory controller of claim 9, wherein at least one ECC memory device is included in the second memory devices of the second channel, the at least one ECC memory device having an ECC data bus; and
  wherein at least one spare bit lane of the ECC data bus is available, while remaining bit lanes of the ECC data bus are utilized for storing data and error correcting code for the second memory devices.

15. The memory controller of claim 14, wherein the circuit performs operations comprising, when the duplicated parity check is a pass using the duplicated commands on the identified bit lane, replacing the selected one of the 1-N bit lanes with the at least one spare bit lane of the ECC data bus, such that the at least one spare bit lane of the at least one ECC memory device is used during normal operation of the second channel to communicate with the memory interface buffer in place of the selected one of the 1-N bit lanes.

16. The memory controller of claim 9, wherein the circuit performs operations comprising changing from a single channel mode to a dual channel mode prior to performing the process.

17. A computer program product for operating a memory controller, the computer program product comprising:
  a computer readable storage medium having program instructions embodied therewith, the program instructions readable by the memory controller to cause the memory controller to perform a method comprising:
  receiving, by the memory controller, detection of an error on a command address bus coupled to a memory interface buffer, the memory interface buffer being configured to communicate with first memory devices of a first channel and second memory devices of a second channel, the command address bus comprising 1-N bit lanes, the command address bus being for the second channel;
  initiating, by the memory controller, a feedback mode in the first memory devices of the first channel and the memory interface buffer, such that an identified memory device of the first memory devices comprises an identified bit lane on a data bus to be utilized for testing;
  performing a process comprising:
    sending commands on the 1-N bit lanes of the command address bus to the memory interface buffer and duplicating commands designated for a selected one of the 1-N bit lanes;
    sending the duplicated commands to the identified bit lane of the data bus such that the identified memory device passes the duplicated commands to the memory interface buffer;
    receiving a result of a parity check for the commands sent on the 1-N bit lanes, such that when the result is a pass the process ends;
    when the result is a fail, checking a duplicated parity check using the duplicated commands sent on the identified bit lane in place of the selected one of the 1-N bit lanes and using the commands sent on the 1-N bit lanes except the selected one of the 1-N bit lanes;
    when the duplicated parity check is a pass using the duplicated commands on the identified bit lane, determining that the selected one is bad and ending the process; and
    when the duplicated parity check is a fail, selecting a next one of the 1-N bit lanes as the selected one and repeating the process.

18. The computer program product of claim 17, wherein checking the duplicated parity check using the duplicated commands sent on the identified bit lane in place of the selected one of the 1-N bit lanes and using the commands sent on the 1-N bit lanes except the selected one of the 1-N bit lanes comprises replacing any commands on the selected one of the 1-N bit lanes with the duplicated commands.

19. The computer program product of claim 17, wherein selecting the next one of the 1-N bit lanes as the selected one and repeating the process comprises continuously iterating to another one of the 1-N bit lanes not previously tested as the selected one until good parity is found.

20. The computer program product of claim 17, further comprising recovering data from the first memory devices of the first channel prior to initiating the feedback mode in the first memory devices of the first channel and the memory interface buffer.

\* \* \* \* \*